(12) United States Patent
Lickfelt et al.

(10) Patent No.: US 10,060,175 B1
(45) Date of Patent: Aug. 28, 2018

(54) SYSTEM AND METHOD FOR HANDLING A VECTOR STATE CHANGE UPON REMOTELY CONTROLLING A BARRIER

(71) Applicant: Honda Motor Co., Ltd., Tokyo (JP)

(72) Inventors: Brian K. Lickfelt, Powell, OH (US); Kevin Lamm, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/810,609

(22) Filed: Nov. 13, 2017

Related U.S. Application Data

(60) Provisional application No. 62/542,755, filed on Aug. 8, 2017.

(51) Int. Cl.
| | |
|---|---|
| G08G 1/01 | (2006.01) |
| E05F 15/73 | (2015.01) |
| G07C 9/00 | (2006.01) |
| H04W 4/021 | (2018.01) |

(52) U.S. Cl.
CPC .......... E05F 15/73 (2015.01); G07C 9/00007 (2013.01); H04W 4/021 (2013.01); *E05F 2015/767* (2015.01); *E05Y 2900/106* (2013.01)

(58) Field of Classification Search
CPC ........... E05F 15/73; G07C 9/00; G08B 21/24; G05B 15/02
USPC ..... 340/935, 933, 988, 989, 994, 5.61, 5.64, 340/5.71, 10.1
See application file for complete search history.

(56) References Cited

U.S. PATENT DOCUMENTS

| | | | |
|---|---|---|---|
| 5,900,806 A | 5/1999 | Issa et al. | |
| 6,091,330 A | 7/2000 | Swan et al. | |
| 6,271,765 B1 | 8/2001 | King et al. | |
| 6,400,956 B1 | 6/2002 | Richton | |
| 6,469,464 B1 | 10/2002 | McCall | |
| 6,476,732 B1 | 11/2002 | Stephan | |
| 6,526,335 B1 | 2/2003 | Treyz et al. | |
| 6,563,278 B2 | 5/2003 | Roman | |
| 6,615,132 B1 | 9/2003 | Nagasaka et al. | |
| 6,711,474 B1 | 3/2004 | Treys et al. | |
| 6,911,898 B2 | 6/2005 | Chung | |
| 6,975,203 B2 | 12/2005 | Brookbank et al. | |
| 7,039,391 B2 | 5/2006 | Rezvani et al. | |
| 7,046,119 B2 | 5/2006 | Ghabra et al. | |

(Continued)

OTHER PUBLICATIONS

Office Action of U.S. Appl. No. 15/803,293 dated Mar. 22, 2018, 48 pages.

*Primary Examiner* — Tai T Nguyen
(74) *Attorney, Agent, or Firm* — Rankin, Hill & Clark LLP

(57) ABSTRACT

A system and method for handling a vector state change upon remotely controlling a barrier that include determining a current state of the barrier when a vehicle travels through at least one first zone associated with the barrier. The system and method also include sending at least one barrier control signal to a barrier controller associated with the barrier when the vehicle travels through at least one second zone to automatically control movement to traverse the barrier to an updated state based on the current state of the barrier. The system and method additionally include determining that the vector state change of the vehicle occurs upon the vehicle traveling through the at least one second zone. The system and method further include presenting a user interface alert regarding the vector state change of the vehicle and the updated state of the barrier.

20 Claims, 8 Drawing Sheets

(56) References Cited

U.S. PATENT DOCUMENTS

| | | |
|---|---|---|
| 7,068,163 B2 | 6/2006 | Sari et al. |
| 7,071,813 B2 | 7/2006 | Fitzgibbon |
| 7,088,265 B2 | 8/2006 | Tsui et al. |
| 7,127,847 B2 | 10/2006 | Fitzgibbon et al. |
| 7,170,248 B2 | 1/2007 | Tsui et al. |
| 7,170,426 B2 | 1/2007 | Tsui et al. |
| 7,183,933 B2 | 2/2007 | Dzurko et al. |
| 7,205,908 B2 | 4/2007 | Tsui et al. |
| 7,310,043 B2 | 12/2007 | Mamaloukas |
| 7,327,107 B2 | 2/2008 | Mullet et al. |
| 7,327,108 B2 | 2/2008 | Mullet et al. |
| 7,332,999 B2 | 2/2008 | Fitzgibbon |
| 7,342,368 B2 | 3/2008 | Roman |
| 7,358,480 B2 | 4/2008 | Mullet et al. |
| 7,498,936 B2 | 3/2009 | Maeng |
| 7,545,833 B2 | 6/2009 | Chau et al. |
| 7,602,283 B2 * | 10/2009 | John ................ G08B 21/14 340/539.11 |
| 7,609,146 B2 | 10/2009 | Tang et al. |
| 7,635,960 B2 | 12/2009 | Mullet et al. |
| 7,710,284 B2 | 5/2010 | Dzurko et al. |
| 7,733,218 B2 | 6/2010 | Drago et al. |
| 7,881,733 B2 | 2/2011 | Staton et al. |
| 7,911,358 B2 | 3/2011 | Bos et al. |
| 7,973,678 B2 | 7/2011 | Petricoin, Jr. et al. |
| 8,049,595 B2 | 11/2011 | Olson et al. |
| 8,058,970 B2 | 11/2011 | Mullet et al. |
| 8,068,006 B2 | 11/2011 | Martin |
| 8,111,997 B2 | 2/2012 | Butler |
| 8,115,616 B2 * | 2/2012 | Gonzaga ................. E05F 15/00 340/457 |
| 8,179,229 B2 | 5/2012 | Mullet |
| 8,244,448 B2 | 8/2012 | Newman |
| 8,279,040 B2 | 10/2012 | Laird |
| 8,291,642 B2 | 10/2012 | Jankovsky |
| 8,299,893 B2 | 10/2012 | Mullet |
| 8,330,572 B2 | 12/2012 | Rodriguez et al. |
| 8,400,264 B2 | 3/2013 | Mullet et al. |
| 8,531,266 B2 | 9/2013 | Shearer et al. |
| 8,577,392 B1 | 11/2013 | Pai et al. |
| 8,643,467 B2 | 2/2014 | Chutorash et al. |
| 8,653,962 B2 | 2/2014 | Maeng |
| 8,710,978 B2 | 4/2014 | Stählin et al. |
| 8,878,646 B2 | 11/2014 | Chutorash et al. |
| 8,922,356 B2 | 12/2014 | Lambert et al. |
| 8,994,496 B2 | 3/2015 | Freese et al. |
| 9,007,168 B2 | 4/2015 | Bos et al. |
| 9,129,502 B2 | 9/2015 | Naim et al. |
| 9,169,684 B2 | 10/2015 | Fan et al. |
| 9,189,952 B2 | 11/2015 | Chutorash et al. |
| 9,208,629 B2 | 12/2015 | Saladin et al. |
| 9,230,378 B2 | 1/2016 | Chutorash et al. |
| 9,264,673 B2 | 2/2016 | Chundrlik, Jr. et al. |
| 9,326,100 B2 | 4/2016 | Guo et al. |
| 9,412,264 B2 | 8/2016 | Geerlings et al. |
| 9,430,939 B2 | 8/2016 | Shearer et al. |
| 9,507,335 B2 | 11/2016 | Wilder et al. |
| 9,509,962 B2 | 11/2016 | Chundrlik, Jr. et al. |
| 9,539,930 B2 | 1/2017 | Geerlings |
| 9,542,834 B2 | 1/2017 | Geerlings et al. |
| 9,551,781 B2 | 1/2017 | Baxley et al. |
| 9,555,814 B2 | 1/2017 | Neubecker et al. |
| 9,556,812 B2 | 1/2017 | Ozkan |
| 9,581,456 B2 | 2/2017 | Liao et al. |
| 9,600,950 B2 | 3/2017 | Chutorash et al. |
| 9,620,005 B2 | 4/2017 | Geerlings et al. |
| 9,656,691 B2 | 5/2017 | Heimberger et al. |
| 9,672,670 B2 | 6/2017 | Menkveld |
| 2003/0174045 A1 | 9/2003 | Zhang |
| 2003/0197594 A1 | 10/2003 | Olson et al. |
| 2003/0197595 A1 | 10/2003 | Olson et al. |
| 2003/0216139 A1 | 11/2003 | Olson et al. |
| 2005/0140321 A1 | 6/2005 | Wojciak, Jr. |
| 2005/0206497 A1 | 9/2005 | Tsui et al. |
| 2006/0158344 A1 | 7/2006 | Bambini et al. |
| 2006/0220834 A1 | 10/2006 | Maeng |
| 2008/0061926 A1 | 3/2008 | Strait |
| 2008/0224819 A1 | 9/2008 | Callentine |
| 2009/0189779 A1 | 7/2009 | Gao |
| 2010/0127882 A1 | 5/2010 | Sitarski |
| 2010/0265034 A1 | 10/2010 | Cap et al. |
| 2011/0032115 A1 | 2/2011 | Kwiecinski et al. |
| 2012/0265874 A1 | 10/2012 | Hoh et al. |
| 2013/0033359 A1 | 2/2013 | Ji et al. |
| 2013/0086841 A1 | 4/2013 | Luper et al. |
| 2013/0147600 A1 | 6/2013 | Murray |
| 2014/0118111 A1 | 5/2014 | Saladin et al. |
| 2014/0167961 A1 | 6/2014 | Finlow-Bates |
| 2014/0266593 A1 | 9/2014 | Nye et al. |
| 2015/0002262 A1 | 1/2015 | Geerlings et al. |
| 2015/0084750 A1 | 3/2015 | Fitzgibbon |
| 2015/0084779 A1 * | 3/2015 | Saladin ............... G07C 9/00896 340/686.6 |
| 2015/0137941 A1 | 5/2015 | Bauer et al. |
| 2015/0148983 A1 | 5/2015 | Fitzgibbon |
| 2015/0235495 A1 | 8/2015 | Hall et al. |
| 2015/0266356 A1 | 9/2015 | Fischer et al. |
| 2015/0302672 A1 | 10/2015 | Kalsi et al. |
| 2015/0302735 A1 | 10/2015 | Geerlings et al. |
| 2015/0302736 A1 | 10/2015 | Geerlings et al. |
| 2015/0302737 A1 | 10/2015 | Geerlings |
| 2015/0348344 A1 | 12/2015 | Rettig et al. |
| 2016/0018798 A1 | 1/2016 | Jiang et al. |
| 2016/0055742 A1 | 2/2016 | Wang et al. |
| 2016/0101736 A1 | 4/2016 | Geerlings et al. |
| 2016/0117879 A1 | 4/2016 | Chutorash et al. |
| 2016/0148451 A1 | 5/2016 | Menkveld |
| 2016/0300415 A1 | 10/2016 | Deneen et al. |
| 2016/0312517 A1 | 10/2016 | Elie et al. |
| 2016/0314362 A1 | 10/2016 | Elie et al. |
| 2016/0321914 A1 | 11/2016 | Geerlings et al. |
| 2016/0343233 A1 | 11/2016 | Wassef et al. |
| 2016/0375898 A1 | 12/2016 | Breuel et al. |
| 2017/0030737 A1 | 2/2017 | Elie et al. |
| 2017/0106874 A1 | 4/2017 | Neubecker et al. |
| 2017/0108873 A1 | 4/2017 | Tanaka et al. |
| 2017/0114585 A1 | 4/2017 | Ozkan |
| 2017/0140646 A1 | 5/2017 | Lu et al. |
| 2017/0147887 A1 | 5/2017 | Be et al. |
| 2017/0154482 A1 | 6/2017 | Osborne |
| 2017/0175433 A1 | 6/2017 | Kang et al. |

* cited by examiner

SYSTEM AND METHOD FOR HANDLING A VECTOR STATE CHANGE UPON REMOTELY CONTROLLING A BARRIER

This application claims priority to U.S. Provisional Application Ser. No. 62/542,755 filed on Aug. 8, 2017, which is expressly incorporated herein by reference.

BACKGROUND

In many cases, movable barriers such garage doors may be mechanically operated to open or close as a vehicle is arriving toward a barrier or departing away from the barrier. In some cases, the vehicle may be located in an area capable of communicating via radio frequency communication with a controller of a barrier (e.g., garage door) in order to actuate the opening or closing of the barrier and the barrier may be opened and closed accordingly. However, in some cases, the driver of the vehicle may decide that they may wish to turn around and not access an area enclosed by the barrier (e.g., garage) upon opening of the barrier. Therefore, if the driver of the vehicle turns the vehicle around thereby causing a vector state change of the vehicle, the barrier may be left in an opened state causing the barrier to be opened as the vehicle is driven away. Similarly, when the vehicle is departing away from the barrier, the closing of the barrier may have already been actuated. Therefore, if the driver of the vehicle turns the vehicle around to reenter the area enclosed by the barrier, thereby causing a vector state change of the vehicle, the barrier may be closed and thereby denying access to the area enclosed by the barrier.

BRIEF DESCRIPTION

According to one aspect, a computer-implemented method for handling a vector state change upon remotely controlling a barrier that includes determining a current state of the barrier when a vehicle travels through at least one first zone associated with the barrier. The method also includes sending at least one barrier control signal to a barrier controller associated with the barrier when the vehicle travels through at least one second zone to automatically control movement to traverse the barrier to an updated state based on the current state of the barrier. The method additionally includes determining that the vector state change of the vehicle occurs upon the vehicle traveling through the at least one second zone. The vector state change occurs when the vehicle changes direction before the vehicle has an opportunity to travel through at least one third zone and the at least one third zone is utilized to send at least one barrier control signal to traverse the barrier to an opened state or a closed state based on the updated state of the barrier. The method further includes presenting a user interface alert regarding the vector state change of the vehicle and the updated state of the barrier.

According to another aspect, a system for handling a vector state change upon remotely controlling a barrier that includes a memory storing instructions when executed by a processor cause the processor to determine a current state of the barrier when a vehicle travels through at least one first zone associated with the barrier. The instructions also cause the processor to send at least one barrier control signal to a barrier controller associated with the barrier when the vehicle travels through at least one second zone to automatically control movement to traverse the barrier to an updated state based on the current state of the barrier. The instructions additionally cause the processor to determine that the vector state change of the vehicle occurs upon the vehicle traveling through the at least one second zone. The vector state change occurs when the vehicle changes direction before the vehicle has an opportunity to travel through at least one third zone and the at least one third zone is utilized to send at least one barrier control signal to traverse the barrier to an opened state or a closed state based on the updated state of the barrier. The instructions further cause the processor to present a user interface alert regarding the vector state change of the vehicle and the updated state of the barrier.

According to still another aspect, a computer readable storage medium storing instructions that when executed by a computer, which includes at least a processor, causes the computer to perform a method that includes determining a current state of a barrier when a vehicle travels through at least one first zone associated with the barrier. The instructions also include sending at least one barrier control signal to a barrier controller associated with the barrier when the vehicle travels through at least one second zone to automatically control movement to traverse the barrier to an updated state based on the current state of the barrier. The instructions additionally include determining that a vector state change of the vehicle occurs upon the vehicle traveling through the at least one second zone. The vector state change occurs when the vehicle changes direction before the vehicle has an opportunity to travel through at least one third zone and the at least one third zone is utilized to send at least one barrier control signal to traverse the barrier to an opened state or a closed state based on the updated state of the barrier. The instructions further includes presenting a user interface alert regarding the vector state change of the vehicle and the updated state of the barrier.

DETAILED DESCRIPTION

Figure 1:
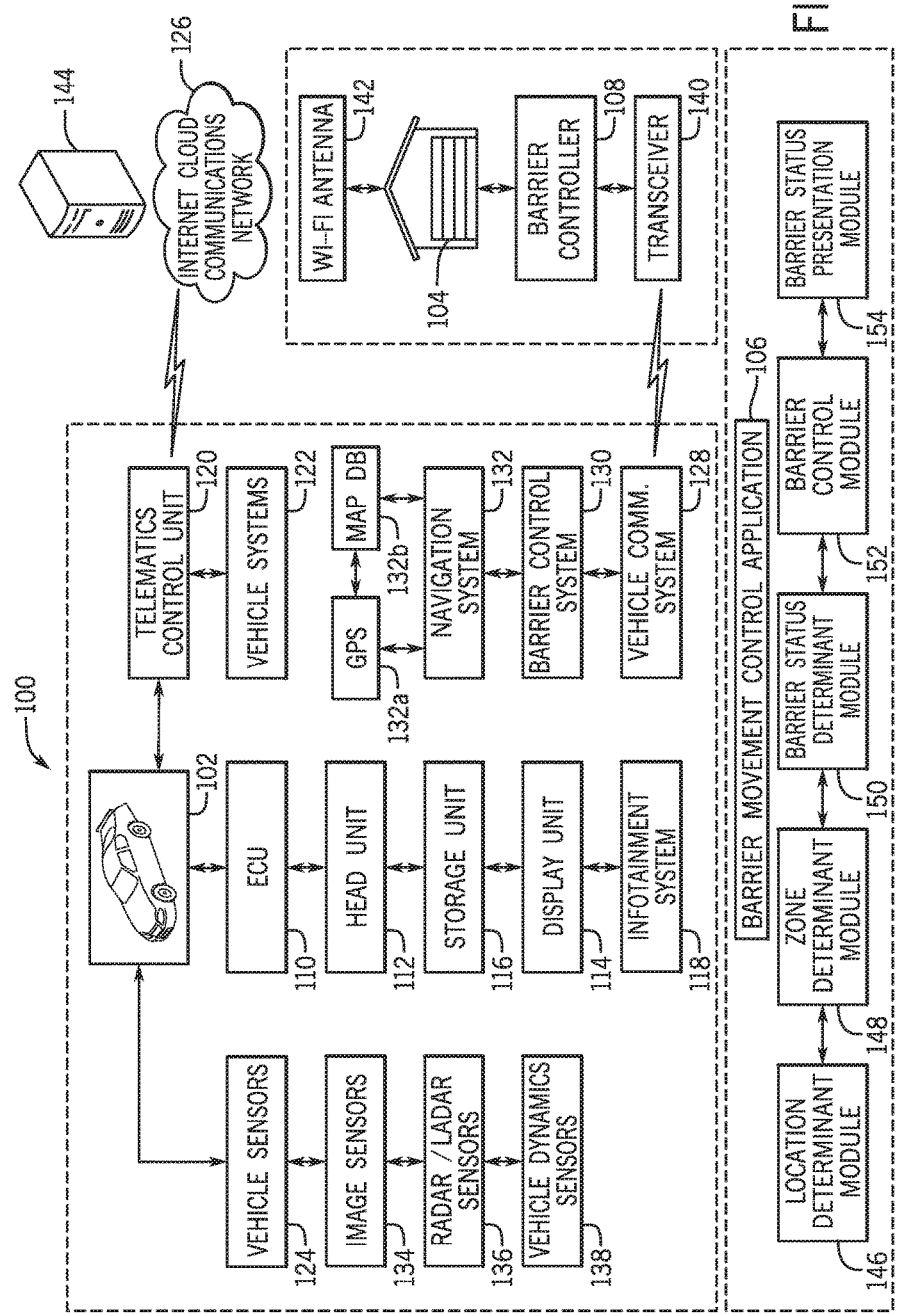
FIG. 1 is a schematic view of an operating environment for implementing systems and methods within a vehicle for handling a vector state change upon determining a current state of a movable barrier and remotely controlling the barrier according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), a Bluetooth® communication system, a radio frequency communication system (e.g., LF radio frequency), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods within a vehicle 102 for handling a vector state change upon determining a current state of a movable barrier (barrier) 104 and remotely controlling the barrier 104 according to an exemplary embodiment. The components of the environment 100, as well as the components of other systems, hardware architectures, and software architectures discussed herein, can be combined, omitted, or organized into different architectures for various embodiments.

Generally, the environment includes a barrier movement control application (barrier control application) 106 that is executed to automatically control the movement of the barrier 104 to traverse (e.g., move) the barrier 104 to an updated state. In other words, the barrier control application 106 may be executed to automatically control movement of the barrier 104 to move the barrier 104 from a current state to the updated state based on the sending and receipt of one or more signals. In one or more embodiments, the barrier 104 may include, but may not be limited to a garage door, a gate (e.g., one or more entry or exit gate doorways), a door (e.g., a residential door), etc., that is traversed from the current state (e.g., opened state or closed state) to the updated state (e.g., closed state or opened state) based on a current location of the vehicle 102, a traveling direction of the vehicle 102 and/or current opened or closed state of the barrier 104. More specifically, the barrier control application 106 may determine that the vehicle 102 is either arriving toward a location at which the barrier 104 is located (arriving toward the barrier 104) or departing away from the location at which the barrier 104 is located (departing away from the barrier 104) and may accordingly determine the current state of the barrier 104. Based on the current state of the barrier 104, the barrier control application 106 may possibly traverse movement of the barrier 104 to the opened state (e.g., to fully open the barrier 104) upon the arrival of the vehicle 102 toward the barrier 104. Additionally, based on the current state of the barrier 104, the barrier control application 106 may traverse the barrier 104 to the closed state (e.g., to fully close the barrier 104) upon the departure of the vehicle 102 away from the barrier 104.

As discussed in much detail below, the barrier control application 106 may be used to determine one or more zones that include boundaries that are associated with the barrier 104 that may be applied by the application 106 to send one or more types of signals to a barrier controller 108 based on one or more factors. The one or more types of signals may be used to determine the current state of the barrier 104, to send a command to traverse the barrier 104 to the updated opened state, or traverse the barrier 104 to the updated closed state. In an exemplary embodiment, the barrier control application 106 may utilize the zones and associated boundaries to determine the current state of the barrier 104 and send one or more barrier control signals to traverse the barrier 104 to the opened state when the vehicle 102 is determined to be arriving toward the barrier 104 and the current state of the barrier 104 is a closed state or a partially opened state. Additionally, the barrier control application 106 may utilize the zones and associated boundaries to determine the current state of the barrier 104 and send one or more barrier control signals to traverse the barrier 104 to the closed state when the vehicle 102 is determined to be departing away from the barrier 104 and the current state of the barrier 104 is an opened state or the partially opened state.

As discussed below, during arrival of the vehicle 102 toward the barrier 104, the barrier control application 106 may operate to handle a circumstance when a vector state change of a vehicle 102 occurs after crossing a boundary that is associated with sending the command to traverse the barrier 104 to the opened state and before the crossing a boundary that is associated with sending the command to traverse the barrier 104 to the closed state. For example, the barrier control application 106 may handle a circumstance when a driver of the vehicle 102 arrives toward the barrier 104, crosses the boundary associated with the sending the command to traverse the barrier 104 to the opened state, and turns the vehicle 102 around to depart away from the barrier 104 before being able to cross and re-cross the boundary associated with sending the command to traverse the barrier 104 to the closed state. In other words, by handing the vector state change, the barrier control application 106 determines such circumstances and enables the driver of the vehicle 102 to manually actuate closure of the barrier 104 to assist in ensuring that the barrier 104 is not remained opened as the vehicle 102 departs away from the barrier 104 due to the vector state change.

Also as discussed below, during departure of the vehicle 102 away from the barrier 104, the barrier control application 106 may operate to handle a circumstance when a vector state change of a vehicle 102 occurs after crossing a boundary that is associated with sending the command to traverse the barrier 104 to the closed state and before the crossing a boundary that is associated with sending the command to traverse the barrier 104 to the opened state. For example, the barrier control application 106 may handle a circumstance when a driver of the vehicle 102 starts to depart away from the barrier 104, crosses the boundary associated with the sending the command to traverse the barrier 104 to the closed state, and turns the vehicle 102 around to arrive toward the barrier 104 before being able to cross and re-cross the boundary associated with sending the command to traverse the barrier 104 to the opened state. In other words, by handing the vector state change, the barrier control application 106 determines such circumstances and enables the driver of the vehicle 102 to manually actuate opening of the barrier 104 to assist in ensuring that the barrier 104 is not closed as the vehicle 102 arrives toward the barrier 104 due to the vector state change.

As discussed in more detail below, upon determining the vector state within the aforementioned circumstances, the barrier control application 106 may present the driver of the vehicle 102 with a barrier status user interface alert (illustrated in FIG. 6, discussed below) relating to an updated state of the barrier 104 that is updated based on the sending of the one or more barrier control signals to traverse the barrier 104 to the opened state or the closed state upon the vehicle 102 crossing the respective boundary.

Figure 3A:
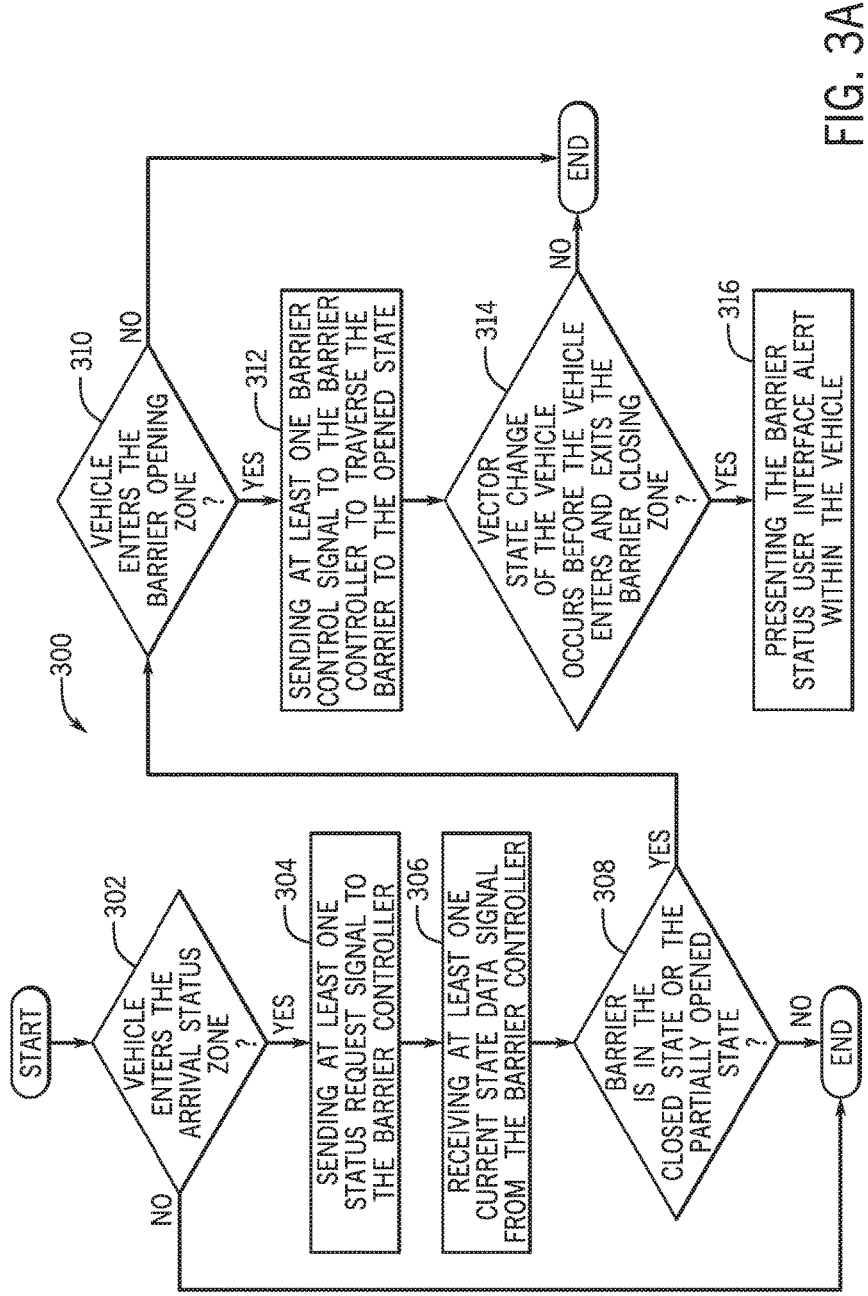
FIG. 3A is a process flow diagram of a method for handling a vector state change upon remotely controlling a barrier to traverse to the opened state according to an exemplary embodiment.
Figure 3B:
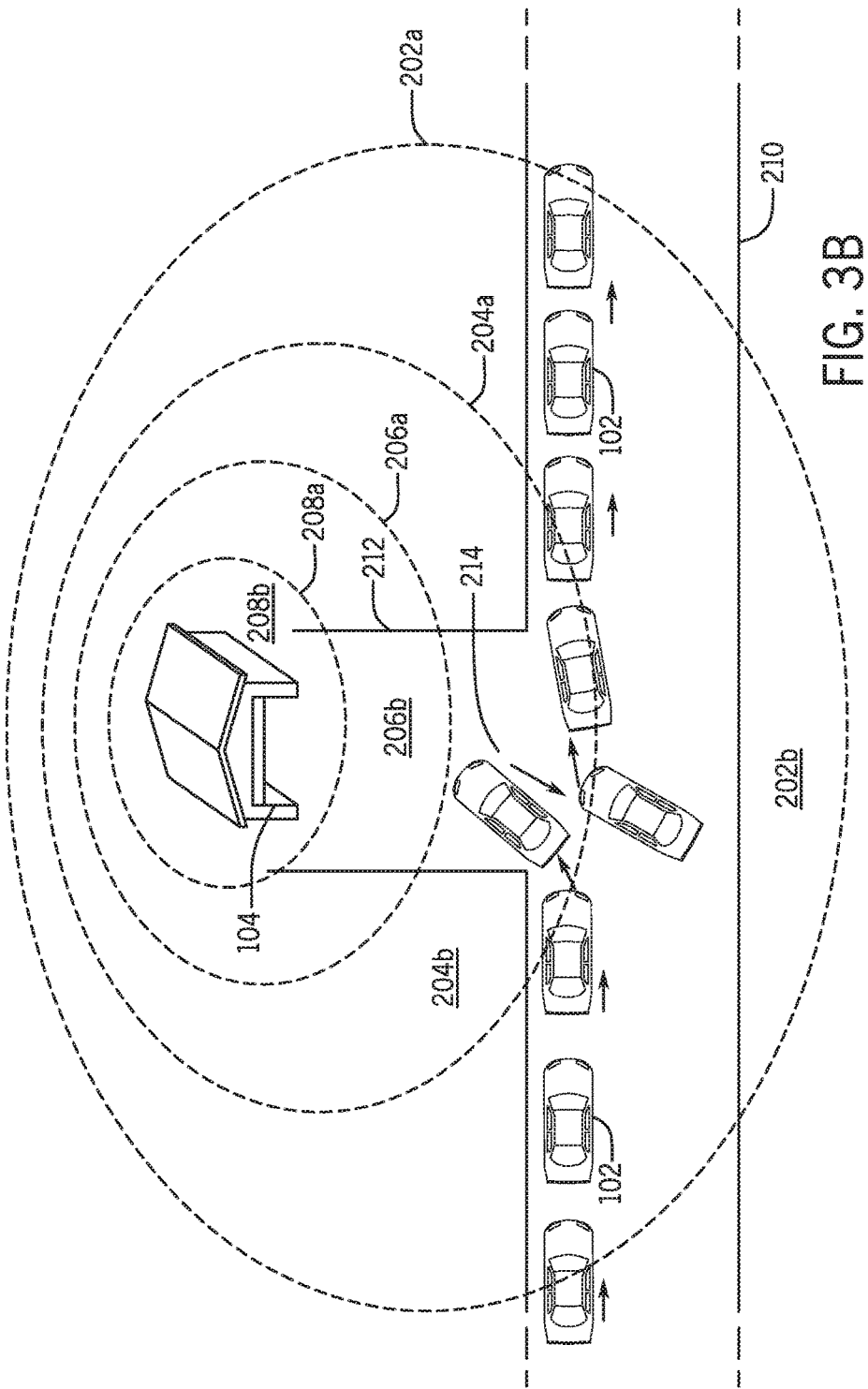
FIG. 3B is an illustrative example of a scenario in which the vector state change of the vehicle occurs during initially arriving toward the barrier according to an exemplary embodiment.

The barrier status user interface alert may provide the driver of the vehicle 102 an indication that the updated state of the barrier 104 may be the opened state even though the vehicle 102 has turned around from its arrival to depart away from the barrier 104 since the vehicle 102 is not crossing the boundary to send the barrier control signal(s) to close the barrier 104 (as illustrated in FIG. 3B, discussed below). Similarly, the barrier status user interface alert may provide the driver of the vehicle 102 an indication that the updated state of the barrier 104 may be the closed state even though the vehicle 102 has turned around from its departure to arrive toward the barrier 104 since the vehicle 102 is not crossing the boundary to send the barrier control signal(s) to open the barrier 104 (as illustrated in FIG. 4B, discussed below).

In the illustrated embodiment of FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 110, a head unit 112, a display unit 114, a storage unit 116, and a telematics control unit (TCU) 120. Additionally, the plurality of components of the vehicle 102 may also include a plurality of vehicle systems 122 and a plurality of vehicle sensors 124.

In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the environment 100. In one embodiment, the ECU 110 may execute one or more operating systems, applications, and/or interfaces that are associated with the vehicle 102 and/or the plurality of vehicle systems 122.

In one embodiment, the ECU 110 may execute the barrier control application 106 when a battery/accessory state of the vehicle 102 is enabled. Once executed, the barrier control application 106 may include components (discussed in more detail below) that may send commands to the components of the vehicle 102 and/or to components external to the vehicle 102 that include but are not limited to the barrier controller 108 operably connected to the barrier 104.

In an exemplary embodiment, the plurality of vehicle sensors 124 of the vehicle 102 may include the image sensors 134, RADAR/LADAR sensors 136, and vehicle dynamics sensors 138. In one embodiment, the image sensors 134 may include a plurality of external and internal cameras that may include, but may not be limited to, an infrared camera, a digital camera, a stereo camera, a video camera (camera types not individually shown), and the like that may be mounted at one or more areas outside of and/or inside of the vehicle 102. In some embodiments, the image sensors 134 may include a plurality of cameras (not shown) that may be mounted at one or more external and interior locations of the vehicle 102 that may include, but may not be limited to, one or more bumpers (not shown), one or more external or internal light fixtures of the vehicle 102, a dashboard of the vehicle 102, a ceiling panel of the vehicle 102, side mirrors of the vehicle 102, a rear view mirror of the vehicle 102, side panels of the vehicle 102, one or more door/door handles of the vehicle 102, (all external and interior locations not individually shown) and the like.

In an exemplary embodiment, the image sensors 134 may be configured to provide a 360 degree stereoscopic view of the surrounding environment of the vehicle 102. The image sensors 134 may be configured to combine image pixels that correspond to the one or more points in a physical scene observed by the plurality of cameras. The image sensors 134 may provide image sensor data that includes a sequence of images/video that may pertain to an exterior environment of the vehicle 102. In one embodiment, the barrier control application 106 may communicate with the image sensors 134 to receive the image data as the vehicle 102 is within an image capturing distance of the barrier 104. In some embodiments, the barrier control application 106 may utilize logic to analyze the one or more images of the barrier 104 to determine the vector state change of the vehicle 102 caused by a change in a travel path of the vehicle 102 during arrival or departure of the vehicle 102. For example, the image sensors 134 may provide image data that may be analyzed by the application 106 to determine that the vehicle 102 turns around after arrival toward the barrier 104 to depart away from the barrier 104. Similarly, the image sensors 134 may provide image data that may analyzed by the application 106 to determine that the vehicle 102 turns around after the departure of the vehicle away from the barrier 104 to arrive toward the barrier 104.

The RADAR/LADAR sensors 136 of the plurality of vehicle sensors 124 may include, but may not be limited to, a millimeter wave radar, a laser detection and range sensor, an infrared sensor, a thermal sensor, and the like. Various alternate or additional hardware devices will be apparent for inclusion as the RADAR/LADAR sensors 136. The RADAR/LADAR sensors 136 may be disposed at one or more areas of the vehicle 102 that may include a front bumper, door panels, vehicle mirrors, a rear bumper, a roof, a floorboard, (areas of the vehicle 102 not individually shown) and the like. In one embodiment, the RADAR/LADAR sensors 136 may provide the barrier control application 106 with sensor wave data pertaining to sensing at least one obstacle that may exist within the movement path of the barrier 104. In one embodiment, the barrier control application 106 may communicate with the RADAR/LADAR sensors 136 to receive the sensor wave data that pertains to the barrier 104. In some embodiments, the barrier control application 106 may utilize logic to analyze the sensor wave data pertaining to the barrier 104 to determine the vector state change of the vehicle 102 during arrival or departure of the vehicle 102 caused by change in the travel path of the vehicle 102.

In one or more embodiments, the vehicle dynamics sensors 138 may communicate with one or more components of the vehicle 102 that may include the ECU 110, an engine (not shown), a transmission (not shown), brakes (not shown), the plurality of vehicle systems 122, and the like to determine vehicle dynamics information. In some embodiments, the vehicle dynamics information may be evaluated by the barrier control application 106 to evaluate vehicle engine operation, vehicle speed, vehicle braking, vehicle steering, engine RPM, and the like to determine the vector state change of the vehicle 102 during arrival or departure of the vehicle 102 caused by change in the travel path of the vehicle 102.

Referring to the head unit 112 of the vehicle 102, the head unit 112 may include internal processing memory, an interface circuit, and bus lines (components of the head unit not shown) for transferring data, sending commands, and communicating with the components of the vehicle 102 directly and/or through the ECU 110. In one or more embodiments, the ECU 110 may execute one or more operating systems, applications, and/or interfaces that are associated to the vehicle 102, the plurality of vehicle systems 122.

In one embodiment, the head unit 112 may be connected to an infotainment system 118. The infotainment system 118 may act as an information hub of the vehicle 102 that presents and delivers information to the driver and passenger(s) of the vehicle 102 (e.g., audio, video, HVAC, barrier controls, etc.). In one embodiment, the infotainment system 118 may be operably connected to a barrier control system 130 of the vehicle 102 to send and receive data signals that may be utilized to remotely control the barrier 104. The infotainment system 118 may also be utilized to provide the barrier status user interface alert to the driver through a display unit 114 operably connected to the infotainment system 118.

The display unit 114 may be disposed within a center stack area of the vehicle 102. Based on the operation of the infotainment system 118, the display unit 114 may display one or more vehicle human machine interfaces (vehicle HMI) to provide the driver of the vehicle 102 with various types of information and/or to receive one or more inputs from the driver of the vehicle 102. More specifically, the vehicle HMI may pertain to one or more operating systems, vehicle system interfaces, and application interfaces, including interfaces pertaining to the barrier control application 106. For example, the vehicle HMI may present one or more user interfaces of the barrier control application 106 including a barrier configuration user interface (not shown) and the barrier status user interface alert. In one or more embodiments, the infotainment system 118 may communicate with one or more additional display units (not shown) within the vehicle 102 that may include, but may not be limited to, a meter display and a head up display that may additionally or alternatively present the vehicle HMI.

In one embodiment, the head unit 112 may be operably connected to one or more notification devices (not shown) within the vehicle 102. More particularly, the head unit 112 may communicate with one or more haptic devices (not shown) (e.g., haptic steering wheel, haptic seats, haptic gear shifter) audio devices (not shown) (e.g., audio system, speakers), etc. that may also be used to provide the barrier status user interface alert relating to the vector state change of the vehicle 102. In other words, the head unit 112 may provide such notifications independent of the operation of the infotainment system 118.

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and the plurality of vehicle systems 122. The storage unit 116 may include one or more barrier profiles that are respectively associated to one or more barriers based on user inputs. As discussed in more detail below, the barrier profile(s) may be created, populated and/or updated by the barrier control application 106.

In one embodiment, a respective barrier profile may include details that are associated with the barrier 104 as identified by the user and/or determined based on vehicle sensors 124. The details may include a barrier type assigned to the barrier 104 (e.g., entrance gate, exit gate, garage door), a name assigned to the barrier 104 by the user (e.g., primary garage door, main gate), a geo-location associated with the barrier 104 (e.g., GPS, DGPS coordinates of the location of the barrier 104), and a plurality of global positioning coordinates associated with respective boundaries of one or more zones associated with the barrier 104 that are utilized by the application 106. As discussed in more detail below, the barrier profile(s) may be created, populated, updated, and/or evaluated to retrieve data based on the execution of the barrier control application 106.

In one embodiment, the TCU 120 of the vehicle 102 may be utilized as an external interface for mobile communication between the vehicle 102 and an internet cloud communication network (internet cloud) 126 to send and retrieve data stored on one or more external devices. In one embodiment, the one or more external devices may include an external server infrastructure 144 that is accessible to provide data to the TCU 120.

In an exemplary embodiment, the TCU 120 may be configured to connect to a GSM, GPRS, Wi-Fi, WiMax, or LTE wireless connection to send and receive one or more data files through the internet cloud 126 to/from the external server infrastructure 144. The TCU 120 may also include a microcontroller (not shown) that controls the processes of the TCU 120 and a storage (not shown) that may include various types of memory to temporarily store data that are provided to/from the components of the vehicle 102.

In one embodiment, the external server infrastructure 144 may include a plurality of interconnected servers that support and maintain data that can be sent to the TCU 120 and may be further utilized by one or more components of the vehicle 102. The external server infrastructure 144 may include but is not limited to web servers, data servers, database servers, domain controllers, backup servers, and the like. In an exemplary embodiment, the external server infrastructure 144 may include a barrier controller data repository (not shown) that includes the current state of the barrier 104 that may be used by the application 106. In one embodiment, upon controlling the movement of the barrier 104 and updating the state of the barrier 104 (e.g., from the opened state to the closed state), the barrier controller 108 may access the internet cloud 126 (e.g., through a Wi-Fi connection) to update and store the updated state of the barrier 104.

With continued reference to the vehicle 102, in addition to the infotainment system 118, the plurality of vehicle systems 122 may include, but may not be limited to, a vehicle communication system 128, the barrier control system 130, and a navigation system 132. In one embodiment, the vehicle communication system 128 may include one or more transceivers that are capable of providing wireless computer communications utilizing various protocols to be utilized to send/receive electronic signals internally to components and systems within the vehicle 102 and to external devices including a transceiver 140 operably connected to a barrier controller 108 associated with the barrier 104.

The vehicle communication system 128 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11 (WiFi), IEEE 802.15.1 (Bluetooth)), a near field communication system (NFC) (e.g., ISO 13157), a local area network (LAN), and/or a point-to-point system. More particularly, the vehicle communication system 128 may be utilized by the barrier control application 106 to send (i.e., transmit) one or more radio frequency (RF) signals in one or more frequencies and/or radio bands to communicate commands and data to the barrier controller 108 through the transceiver 140. In one embodiment, the vehicle communication system 128 may communicate the one or more command signals that include, but are not limited to, at least one barrier status request signal and possibly at least one barrier control signal to the transceiver 140.

In particular, the barrier control application 106 may utilize the vehicle communication system 128 to send the one or more status request signals to be evaluated by the barrier controller 108. Upon evaluating the barrier status request signal(s), barrier controller 108 may determine the current state of the barrier 104 as the opened state, the partially opened state, or the closed state and may communicate the current state in the form of one or more barrier response signals. The vehicle communication system 128 may receive the one or more barrier response signals sent from the transceiver 140 that may be analyzed by the application 106 to determine the current state of the barrier 104.

In one embodiment, the barrier control system 130 of the vehicle 102 may be utilized to provide manual or automatic commands to the vehicle communication system 128 through the infotainment system 118. In particular, the barrier control system 130 may utilize the vehicle communication system 128 to send the one or more barrier control signals to actuate movement of the barrier 104 to open or close the barrier 104 from the current state of the barrier 104 to the updated state of the barrier 104 based on one or more user inputs. In one configuration, the barrier control system 130 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 130 may include one or more input buttons (not shown) that may be inputted by the user to actuate movement of the barrier 104.

In an exemplary embodiment, the navigation system 132 may be connected to the head unit 112, the infotainment system 118, and the display unit 114 to provide a map user interface (not shown) to the driver of the vehicle 102. The navigation system 132 may include a global position system 132*a* (GPS) that may also be used to localize (i.e., determine the GPS or DGPS coordinates) the vehicle 102. The navigation system 132 may include its own processor and memory that communicate with the GPS 132*a* to determine and provide route guidance to the driver of the vehicle 102.

In one or more embodiments, the navigation system 132 may include and/or may connect to and access a map database 132*b* to present one or more details and graphics on the map user interface through the display unit 114. The map database 132*b* may include geographical maps of one or more locations (e.g., countries, regions, cities) in which the vehicle 102 may be driven. The map database 132*b* may also include locational data that pertains to the barrier 104. In one embodiment, the barrier control application 106 may utilize the navigation system 132 to localize the barrier 104 and to determine a plurality of global positioning coordinates associated with one or more areas that are located within the surrounding area of the barrier 104. The plurality of global positioning coordinates associated with the one or more areas may constitute boundaries of the one or more zones associated with the barrier 104.

With particular reference to the barrier 104, the barrier 104 may be connected to and controlled by the barrier controller 108. The barrier controller 108 may include internal processing memory, an interface circuit, and bus lines for transferring data, sending commands, and communicating with the components associated with and/or connected to the barrier 104. In one embodiment, the barrier controller 108 may be connected to a remote control (e.g., garage door remote) (not shown) and an interface device (e.g., wall inputs, numeric key pad) (not shown) that may be used by the user to provide one or more inputs to control movement of the barrier 104.

As discussed above, the barrier controller 108 may be operably connected to the transceiver 140. The barrier controller 108 may be configured to control operation of the transceiver 140 to receive the one or more command signals from the vehicle communication system 128. Additionally, the barrier controller 108 may be configured to control operation of the transceiver 140 to send (e.g., transmit) one or more response signals to the vehicle communication system 128. In particular, the barrier controller 108 may evaluate the one or more data signals received by the transceiver 140 and may instruct the transceiver 140 to send the one or more response data signals.

In an exemplary embodiment, the barrier controller 108 may also be operably connected to a Wi-Fi antenna 142. The Wi-Fi antenna 142 may be utilized as an external interface for mobile communication between the barrier controller 108 and the internet cloud 126 to send and retrieve data stored on the external server infrastructure 144 to store data within the barrier controller data repository. In an exemplary embodiment, the Wi-Fi antenna 142 may be configured to connect to Wi-Fi, WiMax, GSM, GPRS, or LTE wireless connection to send and receive one or more data files through the internet cloud 126 to/from the external server infrastructure 144. In one embodiment, the barrier controller 108 may send a command to the Wi-Fi antenna 142 to communicate with the internet cloud 126 to access the external server infrastructure 144 to store the current status of the barrier 104 and/or the updated status of the barrier 104 (e.g., upon receiving the barrier control signals to traverse the barrier 104 to the opened state or closed state), as determined by the barrier controller 108.

The Barrier Movement Control Application and Related Methods

The components of the barrier control application 106 will now be described according to an exemplary embodiment and with reference to FIG. 1. In an exemplary embodiment, the barrier control application 106 may be stored on the storage unit 116 of the vehicle 102. In alternate embodiments, the barrier control application 106 may be stored on the external server infrastructure 144 and may be accessed by the TCU 120 to be executed by the ECU 110 and/or the head unit 112 of the vehicle 102. As stated above, the barrier control application 106 may be executed when a battery/accessory state of the vehicle 102 is enabled. Therefore, the vehicle 102 (e.g., engine) does not have to be fully enabled for the ECU 110 or the head unit 112 to execute the barrier control application 106.

In an exemplary embodiment, the barrier control application 106 may include a location determinant module 146, a zone determinant module 148, a barrier status determinant module 150, a barrier control module 152, and a barrier status presentation module 154. It is to be appreciated that the barrier control application 106 may include additional modules and/or sub-modules that are configured to execute one or more functions of the application 106. As will be described in more detail below, the location determinant module 146 may be utilized to determine the location of the vehicle 102 with respect to the (location of) the barrier 104. The zone determinant module 148 may determine a plurality of zones associated with the barrier 104 that are utilized to send one or more signals between the vehicle communication system 128 and the transceiver 140. In particular, the zone determinant module 148 may determine the barrier opening zone that includes a boundary that is utilized to send the barrier control signal(s) to the barrier controller 108 to traverse the barrier 104 to the opened state when the vehicle 102 is determined to be arriving toward the barrier 104 and the current state of the barrier 104 is the closed state or partially opened state. The zone determinant module 148 may also determine the barrier closing zone that includes a boundary that is utilized to send the barrier control signal(s)

to the barrier controller 108 to traverse the barrier 104 to the closed state when the vehicle 102 is determined to be departing away from the barrier 104 and the current state of the barrier 104 is the opened state or the partially opened state. The barrier status determinant module 150 may determine the status of the barrier 104 as the opened state, the partially opened state, or the closed state and may communicate the current status of the barrier 104 to the barrier status presentation module 154.

As discussed, the driver of the vehicle 102 may create the barrier profile associated with the barrier 104. In one embodiment, upon creation of the barrier profile, the location determinant module 146 may communicate with the navigation system 132 of the vehicle 102 to determine the geo-location associated with the barrier 104. As discussed below, the geo-location associated with the barrier 104 may be used to determine if the vehicle 102 is being driven and is arriving toward the barrier 104 (i.e., the geo-location associated with the barrier 104). The geo-location associated with the barrier 104 may also be used to determine if the vehicle 102 is being driven and is departing away from the barrier 104 (i.e., the geo-location associated with the barrier 104). In some embodiments, the geo-location associated with the barrier 104 may additionally be used to determine if the vehicle 102 is located (e.g., parked) within a predetermined distance of the barrier 104 that may include the area enclosed by the barrier 104.

In one embodiment, the user may input a user interface icon (not shown) via the vehicle HMI presented on the display unit 114 to create the barrier profile associated with the barrier 104. For example, the driver of the vehicle 102 may wish to create the barrier profile that is associated to the barrier 104 (e.g., garage door) located at the driver's home to enable the application 106 to communicate with the barrier controller 108 (e.g., garage door opener) associated with the barrier 104. Once the user selects the respective user interface icon and inputs the name assigned to the barrier 104 per the user's choosing, the barrier control application 106 may store the barrier profile on the storage unit 116 of the vehicle 102. Upon storing the barrier profile on the storage unit 116, a respective indication may be communicated to the location determinant module 146 indicating that the user has setup the barrier profile associated with the barrier 104.

In an exemplary embodiment, upon receiving the indication that the user has setup the barrier profile associated with the barrier 104, the location determinant module 146 may present a barrier location determination user interface (not shown) to the user. The barrier location determination user interface may be utilized by the driver (or another user) to actuate the determination of the geo-location of the barrier 104 when the vehicle 102 is located within the area enclosed by the barrier 104. More specifically, the barrier location determination user interface may include a user interface object(s) that may be inputted by the user to indicate that the vehicle 102 is within the area enclosed by the barrier 104 to enable the zone determinant module 148 to determine the geo-location of the barrier 104.

In one embodiment, the location determinant module 146 may communicate with the navigation system 132 of the vehicle 102 to determine the geo-location of the barrier 104. The navigation system 132 may access the GPS 132*a* to determine locational coordinates associated with the location of the vehicle 102. In one embodiment, the navigation system 132 may further access the map database 130*a* to determine if a highlighted location that may include a dwelling/building that includes the barrier 104 is located within a predetermined proximity of the vehicle 102 (i.e., of the locational coordinates associated with the location of the vehicle 102 as determined by the GPS 132*a*).

The highlighted location may be indicative of a home location saved by the driver via the map user interface, a point of interest presented on the map interface, and/or a physical address that is included within the map database 130*a*. In one embodiment, when the map database 130*a* communicates that the highlighted location is located within the predetermined proximity of the vehicle 102, the location determinant module 146 may ask the driver (via the barrier location determination user interface) if the driver wishes to interpret the highlighted location as the geo-location associated with the barrier 104. If the driver does wish to interpret the highlighted location as the geo-location associated with the barrier 104, the location determinant module 146 may access the barrier profile and populate the locational coordinates associated with the highlighted location as the geo-location associated with the barrier 104.

In an additional embodiment, the driver may utilize the map user interface of the navigation system 132 to input a saved location that may be utilized by the application 106 as the location of the barrier 104. For example, the driver may input a home location as a saved location on the map user interface. The driver may additionally utilize the barrier configuration user interface to input the saved location as the location of the barrier 104. The location determinant module 146 may communicate with the navigation system 132 to determine the geo-location of the barrier 104 based on the saved location. The location determinant module 146 may further access the barrier profile stored on the storage unit 116 and may populate the locational coordinates associated with the saved location as the geo-location associated with the barrier 104.

As discussed below, the stored geo-location may be used by the application 106 to determine if the vehicle 102 is located within a predetermined vicinity of the barrier 104, if the vehicle 102 is located within the area enclosed by the barrier 104, if the vehicle 102 is arriving toward the barrier 104, or if the vehicle 102 is departing away from the barrier 104. The stored geo-location may be used by the application 106 to determine the one or more zones associated with the barrier 104 utilized by the application 106 to send one or more signals to the barrier controller 108 based on the location and/or a traveling direction of the vehicle 102 with respect to the barrier 104. Additionally, the stored geo-location may be used by the application 106 to determine the vector state change of the vehicle 102 based on a change in the travel path of the vehicle 102 upon arrival or departure of the vehicle 102 with respect to the barrier 104.

In an exemplary embodiment, the location determinant module 146 may also be utilized to determine the location and/or the traveling direction of the vehicle 102 with respect to the barrier 104. In particular, the location determinant module 146 may determine if the vehicle 102 is located within the area enclosed by the barrier 104 (e.g., a garage), the vehicle 102 is located within the predetermined vicinity of the barrier 104 (e.g., 10 m from the barrier), the vehicle 102 is arriving toward the barrier 104 (e.g., vehicle 102 is being driven to the home where the barrier 104 is located), or the vehicle 102 is departing from the barrier 104 (e.g., vehicle 102 is being driven away from the home where the barrier 104 is located).

In one or more embodiments, the location determinant module 146 may additionally determine if the vector state change from the arrival of the vehicle 102 toward the barrier 104 to the departure of the vehicle 102 away from the barrier 104 occurs upon the vehicle 102 crossing the boundary associated with the barrier opening zone before being able to enter and exit the boundary associated with the barrier closing zone. Additionally, the location determinant module 146 may determine if the vector state change from the departure of the vehicle 102 away from the barrier 104 to the arrival of the vehicle 102 toward the barrier 104 occurs upon the vehicle 102 crossing the boundary associated with the barrier closing zone before being able to cross exit and enter the boundary associated with the barrier opening zone.

During the arrival of the vehicle 102, when the vector state change occurs after the vehicle 102 crosses the boundary of the barrier opening zone without entering and exiting the boundary of the barrier closing zone, the location determinant module 146 may communicate respective data to the barrier status presentation module 154 to present the barrier status user interface alert to the driver. The barrier status presentation module 154 may receive the data and may communicate with the infotainment system 118 to present the barrier status user interface alert when the location determinant module 146 determines the vector change of the vehicle 102 changed from arriving toward the barrier 104 to departing from the barrier 104, based on the change of the traveling path of the vehicle 102.

During the departure of the vehicle 102, when the vector state change occurs after the vehicle 102 crosses the boundary of the barrier closing zone without exiting and entering the boundary of the barrier opening zone, the location determinant module 146 may communicate respective data to the barrier status presentation module 154 to present the barrier status user interface alert to the driver. The barrier status presentation module 154 may receive the data and may communicate with the infotainment system 118 to present the barrier status user interface alert when the location determinant module 146 determines the vector change of the vehicle 102 changed from departing from the barrier 104 to arriving toward the barrier 104 based on the change of the traveling path of the vehicle 102.

In one embodiment, the location determinant module 146 may communicate with the navigation system 132 of the vehicle 102 to determine the locational coordinates associated with the (location of the) vehicle 102. In particular, as the vehicle 102 is being driven or is parked, the location determinant module 146 may communicate with the navigation system 132 to continually determine the locational coordinates associated with the vehicle 102 as provided by the GPS 132a. The location determinant module 146 may also access the barrier profile stored on the storage unit 116 to retrieve the geo-location associated with the barrier 104. Upon retrieving the geo-location associated with the barrier 104, the location determinant module 146 may communicate with the navigation system 132 to determine if the vehicle 102 is within a predetermined distance (e.g., within a 0-200 yards) of the geo-location associated with the barrier 104.

If the navigation system 132 determines that the vehicle 102 is within the predetermined vicinity of the geo-location associated with the barrier 104, the location determinant module 146 may communicate with the navigation system 132 to further determine if the locational coordinates associated with the vehicle 102 match (e.g., within a predetermined GPS geo-fence threshold that may encompass portions of the area enclosed by the barrier 104) the geo-location associated with the barrier 104.

In one embodiment, when the navigation system 132 determines that the locational coordinates associated with the vehicle 102 match the geo-location associated with the barrier 104, the navigation system 132 may communicate respective data to the location determinant module 146. The location determinant module 146 may determine that the vehicle 102 is located within the area enclosed by the barrier 104 and may communicate the location of the vehicle 102 to the other modules 148-156 of the application 106. Similarly, when the navigation system 132 determines that the locational coordinates associated with the vehicle 102 are not including the area enclosed by the barrier 104 but are within the predetermined vicinity of the geo-location associated with the barrier 104, the navigation system 132 may communicate respective data to the location determinant module 146. The location determinant module 146 may determine that the vehicle 102 is located within the predetermined vicinity of the barrier 104 and may communicate the location of the vehicle 102 to the other modules 148-156 of the application 106.

In one or more embodiments, the location determinant module 146 may determine when the vehicle 102 is arriving toward the barrier 104 or departing from the barrier 104 based on the stored geo-location of the barrier 104. In particular, when the location determinant module 146 determines that the vehicle 102 is not located within the area enclosed by the barrier 104 or within the predetermined vicinity of the barrier 104, but that the vehicle 102 is located within the predetermined distance of the geo-location associated with the barrier 104, the location determinant module 146 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 146 may communicate with the navigation system 132 to utilize the GPS 132a and the map database 132b to evaluate if the vehicle 102 is being driven away from geo-location associated with the barrier 104. If the navigation system 132 determines that a distance between the locational coordinates of the vehicle 102 is increasing, as provided by the GPS 132a and the geo-location of the barrier 104, the navigation system 132 may communicate respective data to the location determinant module 146. The location determinant module 146 may determine that the vehicle 102 is departing away from the barrier 104 and may communicate the location and traveling direction of the vehicle 102 to the other modules 148-154 of the application 106.

If the location determinant module 146 determines that the vehicle 102 is not located within the first predetermined distance of the geo-location associated with the barrier 104, the location determinant module 146 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 146 may communicate with the navigation system 132 to determine if the vehicle 102 is located within an additional predetermined distance (e.g., 1 mile) of the geo-location associated with the barrier 104 and if the vehicle 102 is arriving toward the barrier 104. In particular, if the navigation system 132 determines that the vehicle 102 is located within the additional predetermined distance of the barrier 104, the navigation system 132 may utilize the GPS 132a and the map database 132b to evaluate if the vehicle 102 is being driven toward the geo-location associated with the barrier 104. If the navigation system 132 determines that a distance between the locational coordinates of the vehicle 102 is decreasing, as provided by the GPS 132a and the geo-location of the barrier 104, the navigation system 132 may communicate respective data to the location determinant module 146. The location determinant module 146 may determine that the vehicle 102 is arriving toward the barrier 104 and may communicate the location and traveling direction of the vehicle 102 to the other modules 148-156 of the application 106.

In one embodiment, the location determinant module 146 may also determine if the vector state change occurs with respect to the vehicle 102 during the arrival of the vehicle 102 toward the barrier 104 based on the stored geo-location of the barrier 104. More specifically, when the location determinant module 146 determines that the vehicle 102 is arriving toward the barrier 104 based on a decrease in the distance between the locational coordinates of the vehicle 102 and the geo-location of the barrier 104, the location determinant module 146 may continue to track the location of the vehicle 102 with respect to the geo-location of the barrier 104. If the vehicle 102 is determined to change its vector by changing its direction and the location determinant module 146 determines that the vehicle 102 has changed course to depart away from the barrier 104 based on an increase in the distance between the location coordinates of the vehicle 102 and the geo-location of the barrier 104, the location determinant module 146 may determine that the vector state change occurs with respect to the vehicle 102 during the arrival of the vehicle 102. As discussed below, the determination of the vector state change occurring may be utilized to present the barrier status user interface alert to the driver of the vehicle 102 if the vehicle 102 is determined to turn around after having crossing the boundary of the barrier opening zone without crossing the boundary of the barrier closing zone to enter and exit the barrier closing zone, thereby leaving the updated state of the barrier 104 as the opened state during the departure of the vehicle 102 away from the barrier 104 (after the vector state change).

The user interface alert may provide the driver an indication that the barrier 104 has not automatically traversed to the closed state even as the vehicle 102 departs from the barrier 104. In one embodiment, the barrier status user interface alert may also include a manual actuation user interface input icon that may be inputted by the driver (e.g., or passenger(s)) of the vehicle 102 to manually actuate movement of the barrier 104. In particular, when the manual actuation user interface input icon is inputted, the vehicle communication system 128 may send one or more barrier control signals to the barrier controller 108 to traverse the barrier 104 from the updated opened state to the closed state.

In one embodiment, the location determinant module 146 may also determine if the vector state change occurs with respect to the vehicle 102 during the departure of the vehicle 102 away from the barrier 104 based on the stored geo-location of the barrier 104. More specifically, when the location determinant module 146 determines that the vehicle 102 is initially departing away from the barrier 104 based on the distance between the locational coordinates of the vehicle 102 and the geo-location of the barrier 104 is increasing, the location determinant module 146 may continue to track the location of the vehicle 102 with respect to the geo-location of the barrier 104. If the vehicle 102 is determined to change its vector by changing its direction and the location determinant module 146 determines that the vehicle 102 has changed course to arrive toward the barrier 104 based on a decrease of the distance between the location coordinates of the vehicle 102, the location determinant module 146 may determine that the vector state change occurs with respect to the vehicle 102 during the departure of the vehicle 102. As discussed below, the determination of the vector state change occurring may be utilized to present the barrier status user interface alert to the driver of the vehicle 102 if the vehicle 102 is determined to turn around after having crossing the boundary of the barrier closing zone without crossing the boundary of the barrier opening zone, to exit and enter the barrier opening zone, thereby leaving the updated state of the barrier 104 as the closed state during the arrival of the vehicle 102 (after the vector state change).

The user interface alert may provide the driver an indication that the barrier 104 has not automatically traversed to the opened state even as the vehicle 102 arrives toward the barrier 104. In one embodiment, the barrier status user interface alert may also include the manual actuation user interface input icon that may be inputted by the driver (e.g., or passenger(s)) of the vehicle 102 to manually actuate movement of the barrier 104. In particular, when the manual actuation user interface input icon is inputted, the vehicle communication system 128 may send one or more barrier control signals to the barrier controller 108 to traverse the barrier 104 from the updated closed state to the opened state (e.g., to allow the driver to access an area/garage enclosed by the barrier 104).

As stated above, the zone determinant module 148 of the barrier control application 106 may determine the plurality of zones associated with the barrier 104. The plurality of zones may include plurality of areas located at a plurality of distances from the barrier 104 and may be provided at specific locations that are utilized during the arrival or departure of the vehicle 102. The plurality of zones may be used to trigger the sending (e.g., transmission) of RF signals by the vehicle communication system 128 to the transceiver 140 operably connected to the barrier controller 108. As discussed in more detail below, one or more specific zones of the plurality of zones may be associated with the barrier 104 and utilized to send one or more specific signals from the barrier status determinant module 150 or the barrier control module 152 (via the vehicle communication system 128) to the barrier controller 108 (via the transceiver 140) when the vehicle 102 is determined to be arriving toward the barrier 104 and entering the zone(s).

Additionally, one or more specific zones of the plurality of zones may be associated with the barrier 104 and utilized to send one or more specific signals from the barrier status determinant module 150 or the barrier control module 152 to the barrier controller 108 when the vehicle 102 is determined to be departing away from the barrier 104 and exiting the zone(s). In particular, the plurality of zones may be specifically associated with the location and/or traveling direction of the vehicle 102 as communicated by the location determinant module 146 when it is determined that the vehicle 102 is arriving toward the barrier 104 or departing away from the barrier 104, and/or when it is determined that the vector state change of the vehicle 102 occurs, as discussed above.

In one or more embodiments, when the vehicle 102 is determined to enter or exit one or more of the respective zones, the barrier status determinant module 150 may utilize the vehicle communication system 128 to send (e.g., transmit) at least one status request signal to the barrier controller 108 to determine the current state of the barrier 104. Upon determining the current state of the barrier 104, when the vehicle 102 crosses the boundary of the barrier opening zone or the barrier closing zone, the barrier control module 152 may automatically send at least one barrier control signal to the barrier controller 108 to actuate the automatic movement of the barrier 104 to traverse the barrier 104 to change the current state to the updated opened state or the updated closed state based on the traveling direction of the vehicle 102 and the current state of the barrier 104.

Figure 2:
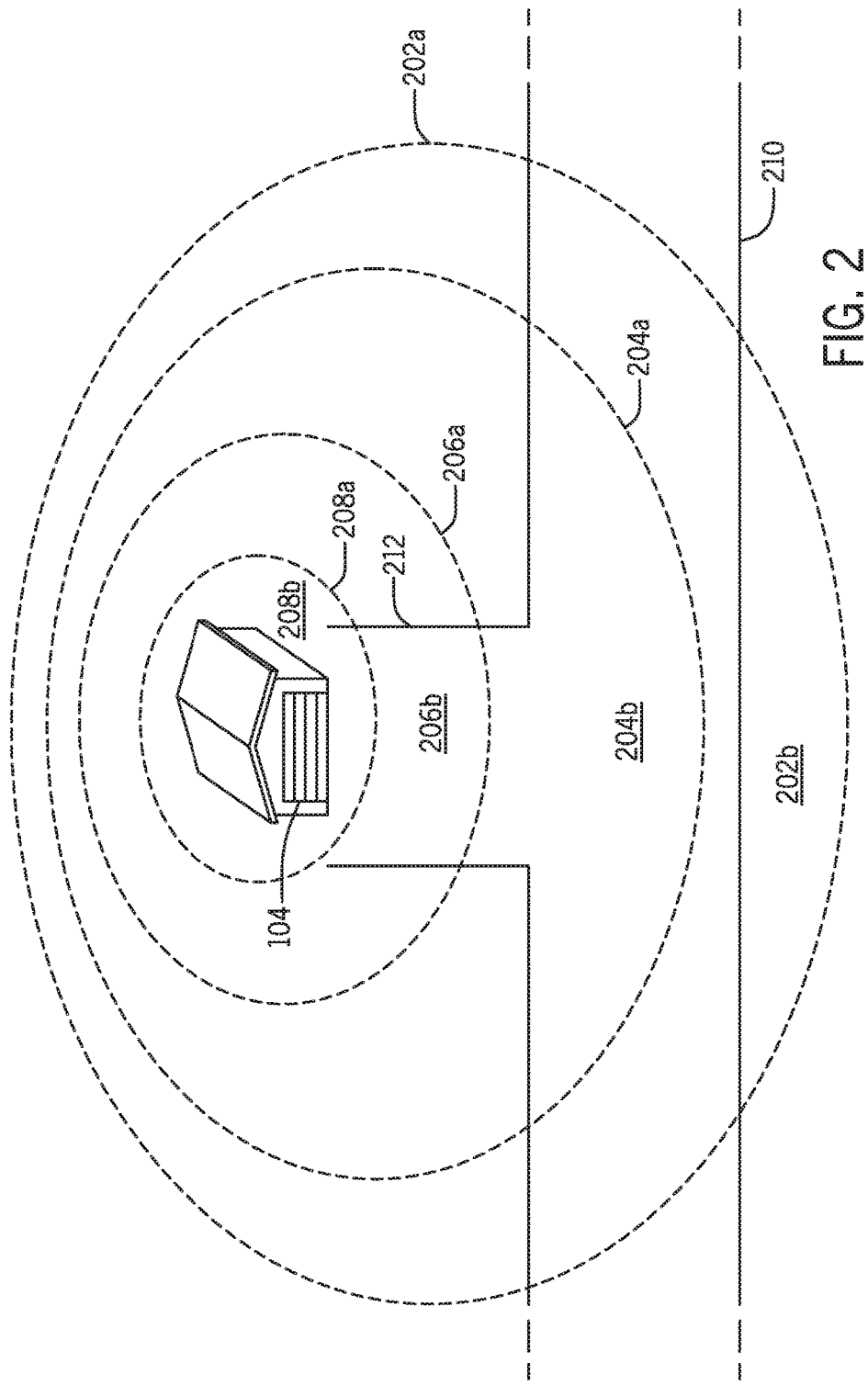
FIG. 2 is an illustrative example of the plurality of zones associated with the barrier that may be applied when the vehicle is determined to be arriving toward the barrier and away from the barrier according to an exemplary embodiment.

FIG. 2 is an illustrative example of the plurality of zones associated with the barrier 104 that may be applied when the vehicle 102 is determined to be arriving toward the barrier 104 and away from the barrier 104 according to an exemplary embodiment. As shown in the illustrative example of FIG. 2, a boundary 202a of an arrival status zone 202b may be determined by the zone determinant module 148 and may be provided as an RF communication trigger point for the barrier status determinant module 150 to utilize the vehicle communication system 128 to send (e.g., transmit) one or more status request signals (e.g., RF signals) to the transceiver 140 to be evaluated by the barrier controller 108. Additionally, a boundary 204a of a barrier opening zone 204b may be determined by the zone determinant module 148 and may be provided as an automatic trigger point for the barrier control system 130 to send the barrier control signal(s) to the barrier 104 to automatically traverse the barrier 104. The zone determinant module 148 may take into account the location at which the vehicle 102 may transmit and receive RF signals to successfully communicate with the barrier controller 108 at an earliest point in time to determine the current state of the barrier 104. This functionality may ensure that the barrier control signal(s) is sent to traverse the barrier 104 to the opened state as the vehicle 102 approaches the barrier 104.

In an exemplary embodiment, upon determining the location of the arrival status zone 202b, the zone determinant module 148 may store a plurality of GPS coordinates associated with the boundary 202a of the arrival status zone 202b. In one or more embodiments, the zone determinant module 148 may communicate with the navigation system 132 to determine the plurality of GPS coordinates (e.g., latitude x, longitude y) of the areas that include the boundary 202a of the arrival status zone 202b. Upon determining the plurality of GPS coordinates associated with the portions of the boundary 202a, the navigation system 132 may communicate the plurality of GPS coordinates to the zone determinant module 148.

Upon determining the location of the arrival status zone 202b, the zone determinant module 148 may access the barrier profile associated with the barrier 104 stored on the storage unit 116 and may populate the plurality of GPS coordinates associated with portions of the boundary 202a of the arrival status zone 202b. As discussed below, the plurality of GPS coordinates populated within the barrier profile may be evaluated in order to send the status request signal(s) to the barrier controller 108 upon the vehicle 102 entering the arrival status zone 202b during the arrival of the vehicle 102 toward the barrier 104.

In an exemplary embodiment, the zone determinant module 148 may determine the barrier opening zone 204b at a determined distance from the barrier 104. The zone determinant module 148 may determine the boundary 204a of the barrier opening zone 204b at a determined adequate distance (e.g., 50 m) from the boundary 202a of the arrival status zone 202b. In particular, upon sending the status request signal(s) to determine the status of the barrier 104, the vehicle 102 will travel the determined adequate distances before possibly sending the barrier control signal(s) when the vehicle 102 enters the barrier opening zone 204b.

In some embodiments, in addition to taking the location of the arrival status zone 202b into account, the zone determinant module 148 may analyze data pertaining to the surrounding environment of the vehicle 102 provided by the map database 132b and may also determine the barrier opening zone 204b according to one or more environmental variables. The one or more environmental variables may include, but are not limited to, the length of the street(s) 208 within the vicinity of the barrier 104, the length of the driveway(s) 212 leading up to the barrier 104, the location of the surrounding structures/object(s) within the vicinity of the barrier 104, and the like.

In particular, the zone determinant module 148 may determine the size of the barrier opening zone 204b to ensure that the barrier control signal(s) may be transmitted to the transceiver 140 at a time that the vehicle 102 is at a requisite distance from the barrier 104. This functionality may ensure that upon determining that the movement path of the barrier 104 is clear, the barrier control signal(s) are sent at an appropriate time to fully open the barrier 104 upon the arrival of the vehicle 102 toward the barrier 104 without compromising the security of contents located behind the barrier 104. For example, in a scenario where the barrier 104 is located further from a street 210 that is used to approach the barrier 104, the barrier opening zone 204b may include a smaller area surrounding the barrier 104 than a scenario where the barrier 104 is located closer to the street 210.

Upon determining the location of the barrier opening zone 204b, the zone determinant module 148 may communicate with the navigation system 132 to determine the plurality of GPS coordinates (e.g., latitude x, longitude y) of the areas that include the boundary 204a of the barrier opening zone 204b. Upon determining the plurality of GPS coordinates associated with the portions of the boundary 204a, the navigation system 132 may communicate the plurality of GPS coordinates to the zone determinant module 148.

The zone determinant module 148 may access the barrier profile associated with the barrier 104 stored on the storage unit 116 and may populate the plurality of GPS coordinates associated with portions of the boundary 204a of the barrier opening zone 204b. As discussed below, the plurality of GPS coordinates populated within the barrier profile may be evaluated in order to send the barrier control signal(s) to the barrier controller 108 upon the vehicle 102 entering the barrier opening zone 204b during the arrival of the vehicle 102 toward the barrier 104.

As additionally shown in the illustrative example of FIG. 2, a departure status zone 208b may be determined by the zone determinant module 148 and may be provided as an RF communication trigger point for the barrier status determinant module 150 to utilize the vehicle communication system 128 to send at least one status request signal to the transceiver 140 to be evaluated by the barrier controller 108. Additionally, a boundary 206a of a barrier closing zone 206b may be determined by the zone determinant module 148 and may be provided as an automatic trigger point for the barrier control system 130 to send the barrier control signal(s) to the barrier 104 to automatically move the barrier 104.

In particular, as the vehicle 102 is departing from the barrier 104 (e.g., reversing away from the barrier 104), the vehicle 102 may exit the departure status zone 208b by crossing a boundary 208a of the departure status zone 208b. Upon crossing the boundary 208a, the barrier status determinant module 150 may utilize the vehicle communication system 128 to determine the current status of the barrier 104. As discussed below in more detail, the current status of the barrier 104 may be used to determine if the barrier control module 152 may send the barrier control signal(s) to traverse the barrier 104 to the closed state upon the vehicle 102 exiting the barrier closing zone 206b.

In one embodiment, upon determining the departure status zone 208b at the first determined distance from the barrier 104, the zone determinant module 148 may communicate with the navigation system 132 to determine the plurality of GPS coordinates (e.g., latitude x, longitude y) of the areas that include the boundary 208a of the departure status zone 208b. Upon determining the plurality of GPS coordinates associated with the portions of the boundary 208a of the departure status zone 208b, the navigation system 132 may communicate the plurality of GPS coordinates to the zone determinant module 148. The zone determinant module 148 may access the barrier profile associated with the barrier 104 stored on the storage unit 116 and may populate the plurality of GPS coordinates associated with portions of the boundary 208a of the departure status zone 208b. As discussed below, the plurality of GPS coordinates populated within the barrier profile may be evaluated in order to send the status request signal(s) to the barrier controller 108 upon the vehicle 102 exiting the departure status zone 208b during the departure of the vehicle 102 away from the barrier 104.

In an exemplary embodiment, the zone determinant module 148 may determine that the boundary 206a of the barrier closing zone 206b is to be provided at a determined adequate distance (e.g., 50 m) from the boundary 208a of the departure status zone 208b and the determined adequate distance (e.g., 30 m) from the boundary 204a of the barrier opening zone 204b. In some embodiments, in addition to taking the location of the departure status zone 302b and the location of the barrier opening zone 204b into account, the zone determinant module 148 may analyze data pertaining to the surrounding environment of the vehicle 102 provided by the map database 132b and may also determine the barrier closing zone 206b according to one or more environmental variables. For instance, the zone determinant module 148 may analyze the length of the street(s) 210 within the vicinity of the barrier 104, the length of the driveway(s) 212 leading up to the barrier 104, the location of the surrounding structures/object(s) within the vicinity of the barrier 104, and the like.

In particular, the zone determinant module 148 may determine the size of the barrier closing zone 206b to ensure that the barrier control signal(s) may be transmitted to the transceiver 140 at a time that the vehicle 102 is at a requisite distance from the barrier 104. This functionality may ensure that the barrier control signal(s) are sent at an appropriate time to fully close the barrier 104 during the departure of the vehicle 102 away from the barrier 104. For example, in a scenario where the barrier 104 is located at the end of a long driveway 212 that is used to depart away from the barrier 104, the barrier closing zone 206b may include a smaller area surrounding the barrier 104 than a scenario where the barrier 104 is located at an end of a short driveway 212.

In an exemplary embodiment, upon determining the barrier closing zone 206b, the zone determinant module 148 may communicate with the navigation system 132 to determine the plurality of GPS coordinates (e.g., latitude x, longitude y) of the areas that include the boundary 206a of the barrier closing zone 206b. Upon determining the plurality of GPS coordinates associated with the portions of the boundary 206a, the navigation system 132 may communicate the plurality of GPS coordinates to the zone determinant module 148. The zone determinant module 148 may access the barrier profile associated with the barrier 104 stored on the storage unit 116 and may populate the plurality of GPS coordinates associated with portions of the boundary 206a of the barrier closing zone 206b. As discussed below, the plurality of GPS coordinates populated within the barrier profile may be evaluated in order to send the barrier control signal(s) to the barrier controller 108 upon the vehicle 102 exiting the barrier closing zone 206b during departure of the vehicle 102 away from the barrier 104.

It is to be appreciated that the zone determinant module 148 may determine multiple respective arrival status zones, departure status zones, barrier opening zones, and barrier closing zones that may be utilized for multiple barriers. For example, if the home of the user includes a gate as a first barrier and a garage door as a second barrier, the zone determinant module 148 may determine an arrival status zone and a departure status zone pertaining to the gate and a separate arrival status zone and departure status zone pertaining to the garage door. The zone determinant module 148 may further determine a barrier opening zone and a barrier closing zone pertaining to the gate and a separate barrier opening zone and a barrier closing zone pertaining to the garage door.

FIG. 3A is a process flow diagram of a method 300 for handling a vector state change upon remotely controlling a barrier 104 to traverse to the opened state according to an exemplary embodiment. FIG. 3A will be described with reference to the components of FIG. 1 though it is to be appreciated that the method 300 of FIG. 3A may be used with other systems and/or components. Additionally, the method 300 of FIG. 3A will be described with reference to the illustrative example of FIG. 2. The method 300 may begin at block 302, wherein the method 300 may include determining if the vehicle 102 enters the arrival status zone 202b. As discussed, when the location determinant module 146 determines that the vehicle 102 is arriving toward the barrier 104, the location determinant module 146 may communicate the location of the vehicle 102 and the traveling direction of the vehicle 102 to the zone determinant module 148. As discussed above, the zone determinant module 148 may determine the plurality of zones associated with the barrier 104 that specifically pertain to the arrival of the vehicle 102 toward the barrier 104.

Upon determining the arrival status zone 202b, the zone determinant module 148 may populate the barrier profile associated with the barrier 104 with the plurality of GPS coordinates associated with portions the boundary 202a of the arrival status zone 202b. In one embodiment, as the vehicle 102 is being driven, the location determinant module 146 may communicate with the navigation system 132 to continually determine the locational coordinates associated with the vehicle 102 as provided by the GPS 132a.

The location determinant module 146 may also access the barrier profile stored on the storage unit 116 and may communicate with the navigation system 132 to determine if the vehicle 102 is entering any of the portions of the boundary 202a of the arrival status zone 202b. More specifically, the location determinant module 146 may continually compare the locational coordinates of the vehicle 102 against the plurality of GPS coordinates associated with portions of the boundary 202a to determine if they overlap with one another. If it is determined that the overlapping of the locational coordinates of the vehicle 102 occurs with the plurality of GPS coordinates associated with portions of the boundary 202a, the location determinant module 146 may determine that the vehicle 102 enters the arrival status zone 202b. For example, if the vehicle 102 is being driven toward the barrier 104, the vehicle 102 may enter the arrival status zone 202b. In such a scenario, the location determinant module 146 may determine when the vehicle 102 enters the arrival status zone 202b once the vehicle 102 crosses one of the portions of the boundary 202a.

If it is determined that the vehicle 102 enters the arrival status zone 202b (at block 302), the method 300 may proceed to block 304, wherein the method 300 may include sending at least one status request signal to the barrier controller 108. In an exemplary embodiment, upon the location determinant module 146 determining that the vehicle 102 is crossing one of the portions of the boundary 202a to enter the arrival status zone 202b, the location determinant module 146 may communicate respective data to the barrier status determinant module 150. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 is currently in the opened state, the closed state, or the partially opened state.

The method 300 may proceed to block 306, wherein the method 300 may include receiving at least one current state data signal from the barrier controller 108. In one or more embodiments, the barrier controller 108 may evaluate the one or more status request signals received by the transceiver 140 and may determine the current state of the barrier 104. The barrier controller 108 may determine the current state as the opened state when the barrier 104 is in a fully opened position. Additionally, the barrier controller 108 may determine the current state as the closed state when the barrier 104 is in a fully closed positon. In some embodiments, the barrier controller 108 may determine the current state of the barrier 104 as the partially opened state when the barrier 104 is partially opened. The barrier controller 108 may further determine the barrier traversing level of the barrier 104 (e.g., 65% open) when the current state of the barrier 104 is the partially opened state.

In an exemplary embodiment, upon determining the current state of the barrier 104, the barrier controller 108 may utilize the transceiver 140 to communicate the one or more current state data signals that include the current state of the barrier 104 as the opened state, the closed state, or the partially opened state to the vehicle communication system 128. In some embodiments, when the barrier 104 is determined to be in the partially opened state, the current data state data signal(s) may additionally include the barrier traversing level of the barrier 104. Upon evaluating the current state of the barrier 104, the barrier status determinant module 150 may communicate respective data to the barrier control module 152 to evaluate the current state of the barrier 104.

The method 300 may proceed to block 308, wherein the method 300 may include determining if the barrier 104 is in the closed state or the partially opened state. As discussed above, upon evaluating the current state of the barrier 104, the barrier status determinant module 150 may communicate respective data to the barrier control module 152 to evaluate the current state of the barrier 104. The barrier control module 152 may evaluate the current state and determine if the barrier 104 is in the closed state or the partially opened state as communicated by the barrier controller 108.

If it is determined that the barrier 104 is in the closed state or the partially opened state (at block 308), the method 300 may proceed to block 310, wherein the method 300 may include determining if the vehicle 102 enters the barrier opening zone 204b. Upon the vehicle 102 entering the arrival status zone 202b and the barrier status determinant module 150 determining that the barrier 104 is in the closed state or the partially opened state, the vehicle 102 may continue to travel through the arrival status zone 202b toward the barrier 104. As the vehicle 102 is traveling through the arrival status zone 202b, the location determinant module 146 may access the barrier profile stored on the storage unit 116 and may communicate with the navigation system 132 to determine if the vehicle 102 is entering any of the portions of the boundary 206a of the barrier opening zone 204b.

More specifically, the location determinant module 146 may continue to compare the locational coordinates of the vehicle 102 against the plurality of GPS coordinates associated with portions of the boundary 206a to determine if they overlap with one another. If it is determined that the overlapping of the locational coordinates of the vehicle 102 occurs with the plurality of GPS coordinates associated with portions of the boundary 206a, the barrier control module 152 determines that the vehicle 102 enters the barrier opening zone 204b.

If it is determined that the vehicle 102 enters the barrier opening zone 204b (at block 310), the method 300 may proceed to block 312, wherein the method 300 may include sending at least one barrier control signal to the barrier controller 108 to traverse the barrier 104 to the opened state. In an exemplary embodiment, the barrier control module 152 may utilize the current state of the barrier 104 as the closed state or the partially opened state to accordingly send the one or more barrier control signals to remotely control the movement of the barrier 104 to traverse the barrier 104 to the opened state as the updated state of the barrier 104.

More specifically, the barrier control module 152 may utilize the vehicle communication system 128 to send the one or more barrier control signals to the transceiver 140 to traverse the barrier 104 from the closed state to the opened state. Likewise, the barrier control module 152 may utilize the vehicle communication system 128 to send the one or more barrier control signals to the transceiver 140 to traverse the barrier 104 from the partially opened state to the (fully) opened state. The barrier controller 108 may evaluate the received barrier control signals and may responsively traverse the barrier 104 from the closed state or partially opened state to the opened state as the updated state of the barrier 104.

The method 300 may proceed to block 314, wherein the method 300 may include determining if a vector state change of the vehicle 102 occurs before the vehicle 102 enters and exits the barrier closing zone 206b. In an exemplary embodiment, the location determinant module 146 may also utilize the stored geo-location of the boundary 204a and 206a to determine if the vector state change occurs with respect to the vehicle 102 during the arrival of the vehicle 102 toward the barrier 104 after the vehicle 102 enters the barrier opening zone 204b and before the vehicle 102 enters and exits the barrier closing zone 206b. For example, it is determined if the vector state change occurs upon the vehicle 102 entering the barrier opening zone 204b, before the vehicle 102 has an opportunity to travel further toward the barrier 104 to enter the barrier closing zone 206b and depart away from the barrier 104 to exit the barrier closing zone 206b to send the barrier control signal(s) to traverse the barrier 104 to the closed state.

If the vehicle 102 is determined to change its vector state by changing its direction and the location determinant module 146 determines that the vehicle 102 has changed course to depart away from the barrier 104 based on an increase in distance between the location coordinates of the vehicle 102 and the geo-location of the barrier 104, the location determinant module 146 may determine that the vector state change occurs with respect to the vehicle 102 during the arrival of the vehicle 102.

The determination of the vector state change between the boundary 204a of the barrier opening zone 204b and the boundary 206a of the barrier closing zone 206b is utilized to determine if the barrier 104 has been automatically traversed to the opened state based on the barrier control signal(s) being sent upon the vehicle 102 entering the barrier opening zone 204b (at block 312) without the barrier control signal(s) being able to be sent to automatically traverse the barrier 104 to the closed state. In other words, the application 106 may use this determination to recognize the situation that the barrier 104 had been traversed to the opened state and remains in the opened state, even though the vehicle 102 has changed course to depart away from the barrier 104 upon the occurrence of the vector state change.

FIG. 3B is an illustrative example of a scenario in which the vector state change of the vehicle 102 occurs during initially arriving toward the barrier 104 according to an exemplary embodiment. As shown, the vehicle 102 may be determined to be arriving toward the barrier 104 and the vector state change may occur at a location 214 that is within the barrier opening zone 204b. The vehicle 102 changes its travel direction at the location 214 to depart away from the barrier 104 before the vehicle 102 crosses the boundary 206a to enter the barrier closing zone 206b and exit the barrier closing zone 206b. In other words, the vehicle 102 will not cross the boundary 206a during departure away from the barrier 104 to exit the barrier closing zone 206b. Consequently, the barrier 104 has been traversed to the updated opened state without being traversed to the closed state during departure of the vehicle 102 that may typically occur upon the vehicle 102 exiting the barrier closing zone 306b (as described below). Therefore, the circumstance may occur that the barrier 104 has been traversed to the updated opened state and remains in the opened state, even though the vehicle 102 has changed its course to depart away from the barrier 104 upon the vector state change.

Referring again to the method 300 of FIG. 3A, if it is determined that the vector state change of the vehicle 102 occurs before the vehicle 102 enters and exits the barrier closing zone 206b (at block 314), the method 300 may procced to block 316, wherein the method 300 may include presenting the barrier status user interface alert within the vehicle 102. Upon the location determinant module 146 determining that the vector state change of the vehicle 102, the location determinant module 146 may communicate respective data to the barrier status presentation module 154. The barrier status presentation module 154 may responsively communicate with the infotainment system 118 to utilize the display unit 114 to present the barrier status user interface alert within the vehicle 102 to alert the driver of the vehicle 102 as to the opened state of the barrier 104.

In one embodiment, the barrier status user interface alert may provide the updated state of the barrier 104 as the opened state to the driver. The user interface alert may provide the driver an indication that the barrier 104 has not automatically traversed to the closed state even as the vehicle 102 departs from the barrier 104. In one embodiment, the barrier status user interface alert may also include the manual actuation user interface input icon. The manual actuation user interface input icon may be inputted by the driver of the vehicle 102 to manually actuate movement of the barrier 104. In particular, when the manual actuation user interface input icon is inputted, the vehicle communication system 128 may send one or more barrier control signals to the barrier controller 108 to traverse the barrier 104 from the updated opened state to the closed state. This functionality may ensure that the barrier 104 is manually traversed to the closed positon as the vehicle 102 departs away from the barrier 104 after changing its course.

Figure 4A:
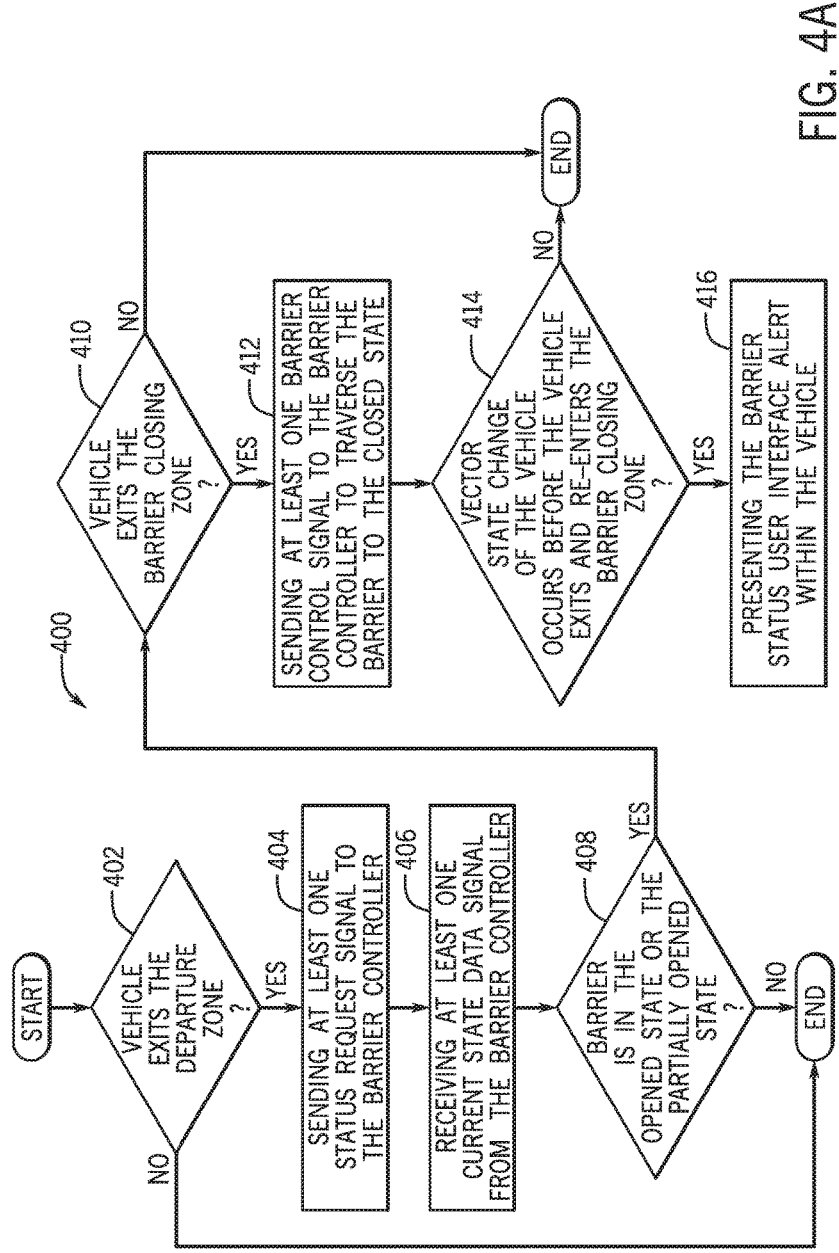
FIG. 4A is a process flow diagram of a method for handling a vector state change upon remotely controlling a barrier to traverse to the closed state according to an exemplary embodiment.
Figure 4B:
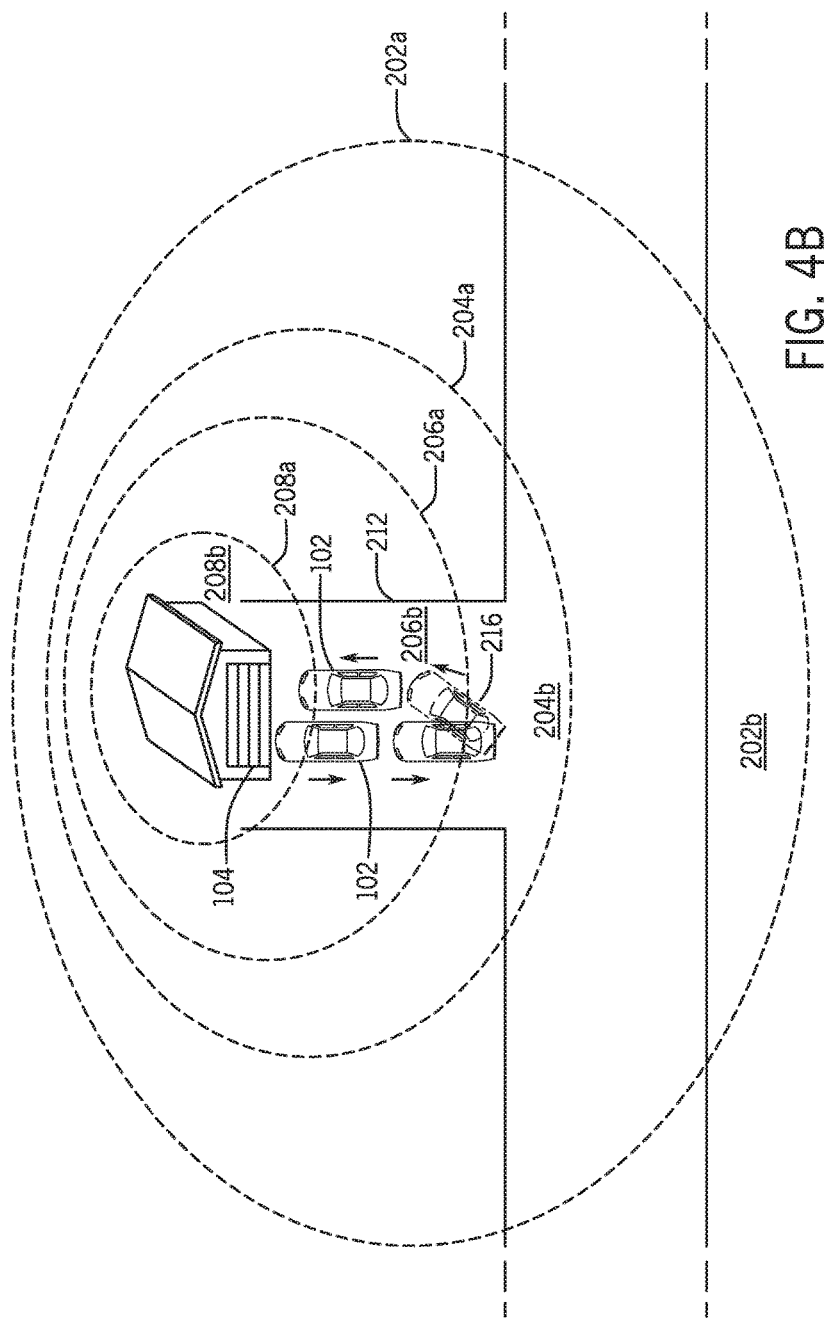
FIG. 4B is an illustrative example of a scenario in which the vector state change of the vehicle occurs during initially departing away from the barrier according to an exemplary embodiment.

FIG. 4A is a process flow diagram of a method 400 for handling a vector state change upon remotely controlling a barrier 104 to traverse to the closed state according to an exemplary embodiment. FIG. 4A will be described with reference to the components of FIG. 1 though it is to be appreciated that the method 400 of FIG. 4A may be used with other systems and/or components.

Additionally, the method 400 of FIG. 4A will be described with reference to the illustrative example of FIG. 2. As shown in FIG. 4A, the method 400 may begin at block 402, wherein the method 400 may include determining if the vehicle 102 exits the departure status zone 208b. In one embodiment, the location determinant module 146 may determine that the vehicle 102 is departing away from the barrier 104 and may communicate the location of the vehicle 102 and the traveling direction of the vehicle 102 to the zone determinant module 148. As discussed above, the zone determinant module 148 may determine the plurality of zones associated with the barrier 104 that specifically pertain to the departure of the vehicle 102 away from the barrier 104.

As discussed above, upon determining the departure status zone 208b, the zone determinant module 148 may populate the barrier profile associated with the barrier 104 with the plurality of GPS coordinates associated with portions the boundary 208a of the departure status zone 208b. In one embodiment, as the vehicle 102 is being driven, the location determinant module 146 may communicate with the navigation system 132 to continually determine the locational coordinates associated with the vehicle 102 as provided by the GPS 132a.

The location determinant module 146 may also access the barrier profile stored on the storage unit 116 and may communicate with the navigation system 132 to determine if the vehicle 102 is exiting any of the portions of the boundary 208a of the departure status zone 208b. More specifically, the location determinant module 146 may continually compare the locational coordinates of the vehicle 102 against the plurality of GPS coordinates associated with portions of the boundary 208a to determine if they overlap with one another.

If it is determined that the overlapping of the locational coordinates of the vehicle 102 occurs with the plurality of GPS coordinates associated with portions of the boundary 208a, the location determinant module 146 may determine that the vehicle 102 exits the departure status zone 208b. For example, if the vehicle 102 is being driven away from the barrier 104 (reversing away from the barrier 104 down the driveway 212), the vehicle 102 may exit the departure status zone 208b. In such a scenario, the location determinant module 146 may determine when the vehicle 102 exits the departure status zone 208b once the vehicle 102 crosses one of the portions of the boundary 208a.

If it is determined that the vehicle 102 exits the departure status zone 208b (at block 402), the method 400 may proceed to block 404, wherein the method 400 may include sending at least one status request signal to the barrier controller 108. In an exemplary embodiment, upon the location determinant module 146 determining that the vehicle 102 is crossing one of the portions of the boundary 208a to exit the departure status zone 208b (at block 402), the location determinant module 146 may communicate respective data to the barrier status determinant module 150. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 is currently in the opened state, the closed state, or the partially opened state.

The method 400 may proceed to block 406, wherein the method 400 may include receiving at least one current state data signal from the barrier controller 108. As discussed above, upon determining the current state of the barrier 104, the barrier controller 108 may utilize the transceiver 140 to communicate the one or more current state data signals that include the current state of the barrier 104 as the opened state, the closed state, or the partially opened state to vehicle communication system 128.

The method 400 may proceed to block 408, wherein the method 400 may include determining if the barrier 104 is in the opened state or the partially opened state. Upon receiving the one or more current state data signals that include the current state of the barrier 104, the vehicle communication system 128 may communicate the current state of the barrier 104 to the barrier status determinant module 150. The barrier status determinant module 150 may responsively determine if the current state of the barrier 104 is in the opened state or the partially opened state. This determination may be made by the barrier status determinant module 150 to determine if the barrier 104 is already closed (e.g., closed beforehand or manually closed) as the vehicle 102 is departing away from the barrier 104.

If it is determined that the barrier 104 is in the opened state or the partially opened state (at block 408), the method 400 may proceed to block 410, wherein the method 400 may include determining if the vehicle 102 exists the barrier closing zone 206b. In one embodiment, upon the vehicle 102 exiting the departure status zone 208b, and the barrier status determinant module 150 determining that the current status of the barrier 104 is the opened state or the partially opened state, the vehicle 102 may continue to travel through the barrier closing zone 206b as the vehicle 102 continues to depart away from the barrier 104. As the vehicle 102 is traveling through the barrier closing zone 206b, the location determinant module 146 may access the barrier profile stored on the storage unit 116 and may communicate with the navigation system 132 to determine if the vehicle 102 is exiting (e.g., crossing) any of the portions of the boundary 206a of the barrier closing zone 206b. More specifically, the location determinant module 146 may continue to compare the locational coordinates of the vehicle 102 against the plurality of GPS coordinates associated with portions of the boundary 206a to determine if they overlap with one another. If it is determined that the overlapping of the locational coordinates of the vehicle 102 occurs with the plurality of GPS coordinates associated with portions of the boundary 206a, the barrier control module 152 determines that the vehicle 102 exits the barrier closing zone 206b.

Upon determining that the vehicle 102 exists the barrier closing zone 206b (at block 410), the method 400 may proceed to block 412, wherein the method 400 may include sending at least one barrier control signal to the barrier controller 108 to traverse the barrier 104 to the closed state. In an exemplary embodiment, the barrier control module 152 may utilize the current state of the barrier 104 as the opened state or the partially opened state to accordingly send the one or more barrier control signals to remotely control the movement of the barrier 104 to traverse the barrier 104 to the closed state, as the updated state of the barrier 104.

More specifically, the barrier control module 152 may utilize the vehicle communication system 128 to send the one or more barrier control signals to the transceiver 140 to traverse the barrier 104 from the opened state to the closed state. Likewise, the barrier control module 152 may utilize the vehicle communication system 128 to send the one or more barrier control signals to the transceiver 140 to traverse the barrier 104 from the partially opened state to the (fully) closed state. The barrier controller 108 may evaluate the received barrier control signals and may responsively traverse the barrier 104 from the opened state or partially opened state to the closed state, as the updated state of the barrier 104.

The method 400 may proceed to block 414, wherein the method 400 may include determining if a vector state change of the vehicle 102 occurs before the vehicle 102 exits and re-enters the barrier opening zone 204b. In an exemplary embodiment, the location determinant module 146 may also utilize the stored geo-location of the boundary 206a and 204a to determine if the vector state change occurs with respect to the vehicle 102 during the departure of the vehicle 102 away from the barrier 104 after the vehicle 102 exits the barrier closing zone 206b and before the vehicle 102 exits and re-enters the barrier opening zone 204b. For example, it is determined if the vector state change occurs upon the vehicle 102 exiting the barrier closing zone 206b, before the vehicle 102 has an opportunity to travel further away from the barrier 104 to exit the barrier opening zone 204b while departing away from the barrier 104 and re-enter the barrier opening zone 204b after changing its course to arrive toward the barrier 104 to send the barrier control signal(s) to traverse the barrier 104 to the opened state.

If the vehicle 102 is determined to change its vector state by changing its direction and the location determinant module 146 determines that the vehicle 102 has changed course to arrive toward the barrier 104 based on a decrease in distance between the location coordinates of the vehicle 102 and the geo-location of the barrier 104, the location determinant module 146 may determine that the vector state change occurs with respect to the vehicle 102 during the departure of the vehicle 102.

The determination of the vector state change between the boundary 206a of the barrier closing zone 206b and the boundary 204a of the barrier opening zone 204b is utilized to determine if the barrier 104 has been automatically traversed to the updated closed state based on the barrier control signal(s) being sent upon the vehicle 102 exiting the barrier closing zone 206b (at block 412) without the barrier control signal(s) being able to be sent to automatically traverse the barrier 104 to the opened state. In other words, the application 106 may use this determination to recognize the situation that the barrier 104 had been traversed to the closed state and remains in the closed state, even though the vehicle 102 has changed course to arrive toward the barrier 104 upon the occurrence of the vector state change.

FIG. 4B is an illustrative example of a scenario in which the vector state change of the vehicle 102 occurs during initially departing away from the barrier 104 according to an exemplary embodiment. As shown, the vehicle 102 may be determined to be departing away from the barrier 104 as the vehicle 102 is initially reversing away from the barrier 104 and the vector state change may occur at a location 216 that is within the barrier opening zone 204b. The vehicle 102 changes its travel direction to arrive toward the barrier 104 at the location 216 before the vehicle 102 has an opportunity to cross the boundary 204a to exit the barrier closing zone 206b during departure and re-enter the barrier closing zone 206b during arrival of the vehicle 102 toward the barrier 104 upon the vehicle 102 changing its course. Consequently, the barrier 104 has been traversed to the closed state without being traversed to the opened state during the arrival of the vehicle 102 since the vehicle 102 does not re-enter the barrier opening zone 204b that is utilized to send the barrier control signal(s) to traverse the barrier 104 to the opened state (as described above at block 312). Therefore, the circumstance may occur that the barrier 104 has been traversed to the closed state and remains in the closed state, even though the vehicle 102 has changed course to arrive toward the barrier 104 upon the vector state change.

Referring again to the method 400 of FIG. 4A, if it is determined that the vector state change of the vehicle 102 occurs before the vehicle 102 exits and re-enters the barrier opening zone 204b (at block 414), the method 400 may proceed to block 416, wherein the method 400 may include presenting the barrier status user interface alert within the vehicle 102. Upon the location determinant module 146 determining that the vector state change of the vehicle 102, the location determinant module 146 may communicate respective data to the barrier status presentation module 154. The barrier status presentation module 154 may responsively communicate with the infotainment system 118 to utilize the display unit 114 to present the barrier status user interface alert within the vehicle 102 to alert the driver of the vehicle 102 as to the closed state of the barrier 104.

In one embodiment, the barrier status user interface alert may provide the updated state of the barrier 104 as the closed state to the driver. The user interface alert may provide the driver an indication that the barrier 104 has not automatically traversed to the opened state even as the vehicle 102 arrives toward the barrier 104. In one embodiment, the barrier status user interface alert may also include the manual actuation user interface input icon. The manual actuation user interface input icon may be inputted by the driver of the vehicle 102 to manually actuate movement of the barrier 104. In particular, when the manual actuation user interface input icon is inputted, the vehicle communication system 128 may send one or more barrier control signals to the barrier controller 108 to traverse the barrier 104 from the updated closed state to the opened state. This functionality may ensure that the barrier 104 is manually traversed to the opened positon as the vehicle 102 arrives toward the barrier 104 after changing its course.

Figure 5:
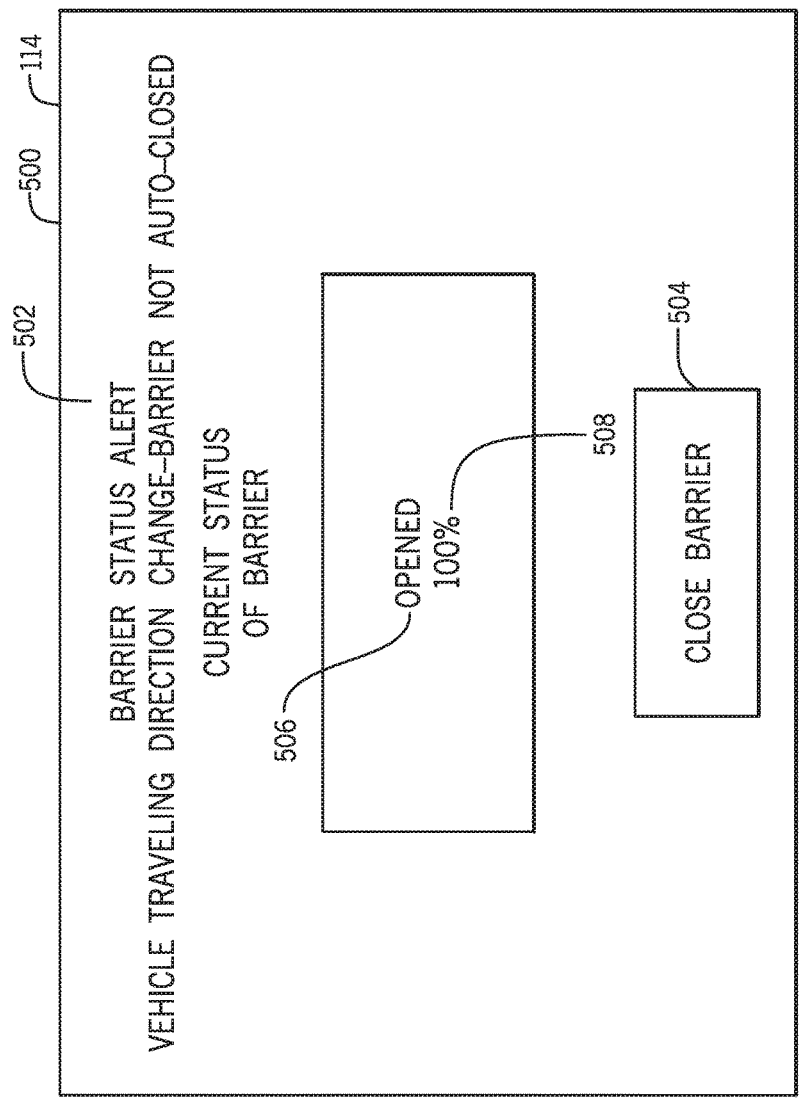
FIG. 5 is an illustrative example of the barrier user interface alert presented on the display unit of the vehicle according to an exemplary embodiment.

FIG. 5 is an illustrative example of the barrier user interface alert 500 presented on the display unit 114 of the vehicle 102 according to an exemplary embodiment. As discussed, the barrier user interface alert 500 may be presented when the barrier control application 106 determines the vector state change of the vehicle 102 within the barrier opening zone 204b. As shown, the barrier user interface alert 500 may include an alert message 502 that alerts the driver of the vehicle 102 that the barrier 104 was not automatically opened/closed during the arrival/departure of the vehicle 102 based on the vector state change of the vehicle 102. The barrier user interface alert 500 may also include the manual actuation user interface input icon 504 that may be inputted by the driver (e.g., or passenger(s)) of the vehicle 102 to manually actuate the sending of the at least one barrier control signal to open or close the barrier 104. In one embodiment, the barrier user interface alert 500 may additionally include the current status 506 of the barrier 104 as determined based on the vehicle 102 entering the arrival status zone 202b or the vehicle 102 exiting the departure status zone 302b. Additionally, the barrier user interface alert 500 may include the barrier traversing level 508 that indicates the opening/closing level of the barrier 104.

Figure 6:
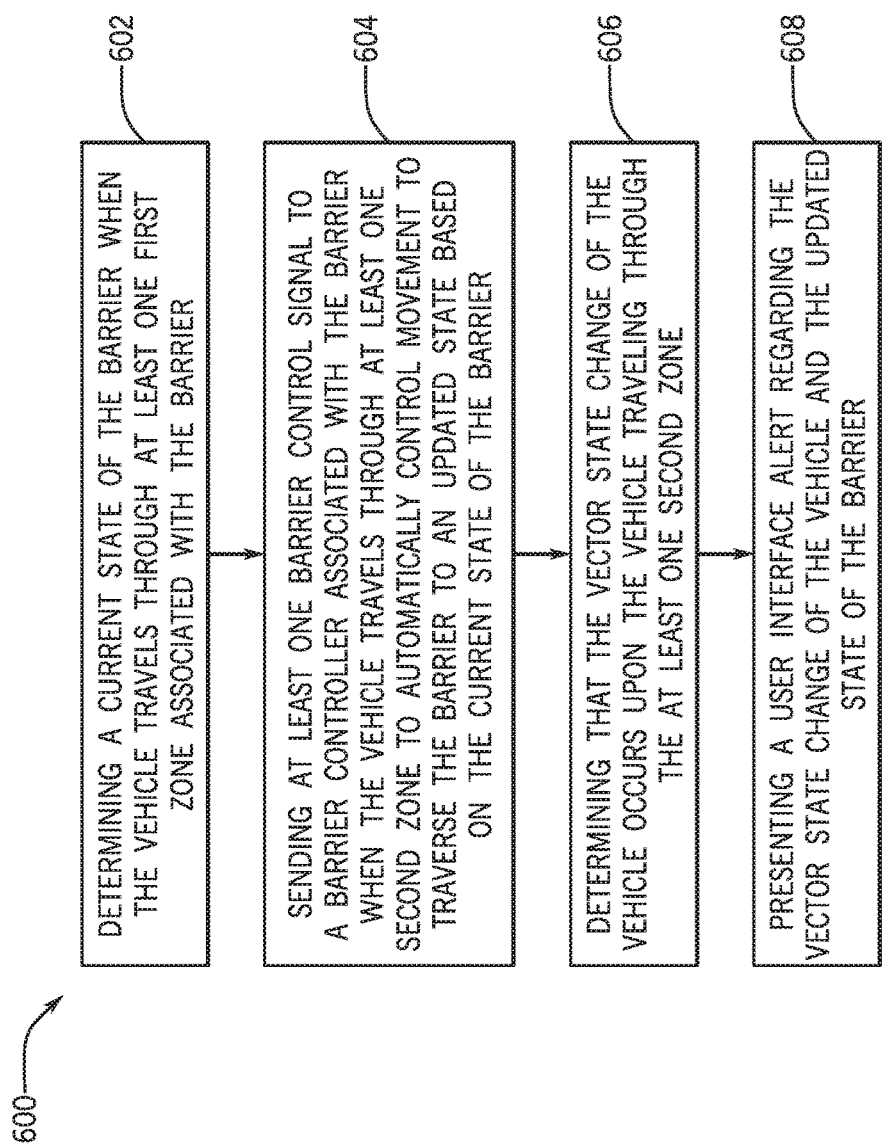
FIG. 6 is a process flow diagram of a method for handling a vector state change upon remotely controlling a barrier according to an exemplary embodiment.

FIG. 6 is a process flow diagram of a method 600 for handling a vector state change upon remotely controlling a barrier 104 according to an exemplary embodiment. FIG. 6 will be described with reference to the components of FIG. 1 though it is to be appreciated that the method of FIG. 6 may be used with other systems and/or components. The method 600 may begin at block 602, wherein the method 600 includes determining a current state of the barrier 104 when the vehicle 102 travels through at least one first zone associated with the barrier 104.

The method 600 may proceed to block 604, wherein the method 600 may include sending at least one barrier control signal to a barrier controller 108 associated with the barrier 104 when the vehicle 102 travels through at least one second zone to automatically control movement to traverse the barrier 104 to an updated state based on the current state of the barrier 104.

The method 600 may proceed to block 606, wherein the method 600 may include determining that the vector state change of the vehicle 102 occurs upon the vehicle 102 traveling through the at least one second zone. The vector state change occurs when the vehicle 102 changes direction before the vehicle 102 has an opportunity to travel through at least one third zone. The method 600 may proceed to block 608, wherein the method 600 may include presenting a user interface alert regarding the vector state change of the vehicle and the updated state of the barrier.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for handling a vector state change upon remotely controlling a barrier, comprising:
   determining, with a barrier status determinant module, a current state of the barrier when a vehicle travels through at least one first zone associated with the barrier;
   sending from a barrier control module, at least one barrier control signal to a barrier controller associated with the barrier when the vehicle travels through at least one second zone to automatically control movement to traverse the barrier to an updated state based on the current state of the barrier;
   determining, with a location determinant module, that the vector state change of the vehicle occurs upon the vehicle traveling through the at least one second zone, wherein the vector state change occurs when the vehicle changes direction before the vehicle has an opportunity to travel through at least one third zone, wherein the at least one third zone is utilized to send at least one barrier control signal to traverse the barrier to an opened state or a closed state based on the updated state of the barrier; and
   presenting, with a barrier status presentation module, a user interface alert regarding the vector state change of the vehicle and the updated state of the barrier.

2. The computer-implemented method of claim 1, wherein determining the current state of the barrier includes determining that the barrier is at least one of: the opened state, a partially opened state, and the closed state, wherein the current state of the barrier is determined when at least one of: the vehicle enters the at least one first zone when the vehicle is determined to arrive toward the barrier and the vehicle exits the at least one first zone when the vehicle is determined to depart away from the barrier.

3. The computer-implemented method of claim 1, wherein sending the at least one barrier control signal to the barrier controller includes determining that the vehicle is initially arriving toward the barrier and sending the at least one barrier control signal to traverse the barrier to the opened state as the updated state, wherein the at least one barrier control signal is sent to traverse the barrier to the opened state upon determining that the current state of the barrier is the closed state or a partially opened state.

4. The computer-implemented method of claim 3, wherein determining that the vector state change of the vehicle occurs includes determining that the vehicle is initially arriving toward the barrier and that the vehicle changes its direction to depart away from the barrier within the at least one second zone.

5. The computer-implemented method of claim 4, wherein determining that the vector state change of the vehicle occurs includes determining that the vehicle changes direction within the at least one second zone before the vehicle has an opportunity to enter and exit the at least one third zone that is utilized to traverse the barrier to the closed state upon determining that the vehicle is departing away from the barrier and the updated state of the barrier is the opened state.

6. The computer-implemented method of claim 1, wherein sending the at least one barrier control signal to the barrier controller includes determining that the vehicle is departing away from the barrier and sending the at least one barrier control signal to traverse the barrier to the closed state as the updated state, wherein the at least one barrier control signal is sent to traverse the barrier to the closed state upon determining that the current state of the barrier is the opened state or a partially opened state.

7. The computer-implemented method of claim 6, wherein determining that the vector state change of the vehicle occurs includes determining that the vehicle is initially departing away from the barrier and that the vehicle changes its direction to arrive toward the barrier within the at least one second zone.

8. The computer-implemented method of claim 7, wherein determining that the vector state change of the vehicle occurs includes determining that the vehicle changes direction within the at least one second zone before the vehicle has an opportunity to exit and re-enter the at least one third zone that is utilized to traverse the barrier to the opened state upon determining that the vehicle is arriving toward the barrier and the updated state of the barrier is the closed state.

9. The computer-implemented method of claim 1, wherein presenting the user interface alert regarding the vector state change of the vehicle includes providing a manual actuation user interface input icon that is utilized to at least: traverse the barrier to the closed state when the updated state of the barrier is the opened state and the vehicle is determined to change direction to depart away from the barrier within the at least one second zone, and traverse the barrier to the opened state when the updated state of the barrier is the closed state and the vehicle is determined to change direction to arrive toward the barrier within the at least one second zone.

10. A system for handling a vector state change upon remotely controlling a barrier, comprising:
    a memory storing instructions when executed by a processor cause the processor to:
    determine, with a barrier status determinant module, a current state of the barrier when a vehicle travels through at least one first zone associated with the barrier;
    send from a barrier control module, at least one barrier control signal to a barrier controller associated with the barrier when the vehicle travels through at least one second zone to automatically control movement to traverse the barrier to an updated state based on the current state of the barrier;
    determine, with a location determinant module, that the vector state change of the vehicle occurs upon the vehicle traveling through the at least one second zone, wherein the vector state change occurs when the vehicle changes direction before the vehicle has an opportunity to travel through at least one third zone, wherein the at least one third zone is utilized to send at least one barrier control signal to traverse the barrier to an opened state or a closed state based on the updated state of the barrier; and
    present, with a barrier status presentation module, a user interface alert regarding the vector state change of the vehicle and the updated state of the barrier.

11. The system of claim 10, wherein determining the current state of the barrier includes determining that the barrier is at least one of: the opened state, a partially opened state, and the closed state, wherein the current state of the barrier is determined when at least one of: the vehicle enters the at least one first zone when the vehicle is determined to arrive toward the barrier and the vehicle exits the at least one first zone when the vehicle is determined to depart away from the barrier.

12. The system of claim 10, wherein sending the at least one barrier control signal to the barrier controller includes determining that the vehicle is initially arriving toward the barrier and sending the at least one barrier control signal to traverse the barrier to the opened state as the updated state, wherein the at least one barrier control signal is sent to traverse the barrier to the opened state upon determining that the current state of the barrier is the closed state or a partially opened state.

13. The system of claim 12, wherein determining that the vector state change of the vehicle occurs includes determining that the vehicle is initially arriving toward the barrier and that the vehicle changes its direction to depart away from the barrier within the at least one second zone.

14. The system of claim 13, wherein determining that the vector state change of the vehicle occurs includes determining that the vehicle changes direction within the at least one second zone before the vehicle has an opportunity to enter and exit the at least one third zone that is utilized to traverse the barrier to the closed state upon determining that the vehicle is departing away from the barrier and the updated state of the barrier is the opened state.

15. The system of claim 10, wherein sending the at least one barrier control signal to the barrier controller includes determining that the vehicle is departing away from the barrier and sending the at least one barrier control signal to traverse the barrier to the closed state as the updated state, wherein the at least one barrier control signal is sent to traverse the barrier to the closed state upon determining that the current state of the barrier is the opened state or a partially opened state.

16. The system of claim 15, wherein determining that the vector state change of the vehicle occurs includes determining that the vehicle is initially departing away from the barrier and that the vehicle changes its direction to arrive toward the barrier within the at least one second zone.

17. The system of claim 16, wherein determining that the vector state change of the vehicle occurs includes determining that the vehicle changes direction within the at least one second zone before the vehicle has an opportunity to exit and re-enter the at least one third zone that is utilized to traverse the barrier to the opened state upon determining that the vehicle is arriving toward the barrier and the updated state of the barrier is the closed state.

18. The system of claim 10, wherein presenting the user interface alert regarding the vector state change of the vehicle includes providing a manual actuation user interface input icon that is utilized to at least: traverse the barrier to the closed state when the updated state of the barrier is the opened state and the vehicle is determined to change direction to depart away from the barrier within the at least one second zone, and traverse the barrier to the opened state when the updated state of the barrier is the closed state and the vehicle is determined to change direction to arrive toward the barrier within the at least one second zone.

19. A non-transitory computer readable storage medium storing instructions that when executed by a computer, which includes a processor, perform a method, the method comprising:
 determining, with a barrier status determinant module, a current state of a barrier when a vehicle travels through at least one first zone associated with the barrier;
 sending from a barrier control module, at least one barrier control signal to a barrier controller associated with the barrier when the vehicle travels through at least one second zone to automatically control movement to traverse the barrier to an updated state based on the current state of the barrier;
 determining, with a location determinant module, that a vector state change of the vehicle occurs upon the vehicle traveling through the at least one second zone, wherein the vector state change occurs when the vehicle changes direction before the vehicle has an opportunity to travel through at least one third zone, wherein the at least one third zone is utilized to send at least one barrier control signal to traverse the barrier to an opened state or a closed state based on the updated state of the barrier; and
 presenting, with a barrier status presentation module, a user interface alert regarding the vector state change of the vehicle and the updated state of the barrier.

20. The non-transitory computer readable storage medium of claim 19, wherein presenting the user interface alert regarding the vector state change of the vehicle includes providing a manual actuation user interface input icon that is utilized to at least: traverse the barrier to the closed state when the updated state of the barrier is the opened state and the vehicle is determined to change direction to depart away from the barrier within the at least one second zone, and traverse the barrier to the opened state when the updated state of the barrier is the closed state and the vehicle is determined to change direction to arrive toward the barrier within the at least one second zone.

\* \* \* \* \*